United States Patent
Zhang et al.

(10) Patent No.: US 9,338,655 B2
(45) Date of Patent: *May 10, 2016

(54) ACCESS CONTROL OF RELAY NODE WITH CLOSED SUBSCRIBER GROUP

(75) Inventors: Shun Liang Zhang, Beijing (CN); Simone Redana, Munich (DE); Bernhard Raaf, Neuried (DE); Lei Du, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 226 days.

This patent is subject to a terminal disclaimer.

(21) Appl. No.: 13/977,357

(22) PCT Filed: Dec. 28, 2010

(86) PCT No.: PCT/EP2010/070799
§ 371 (c)(1),
(2), (4) Date: Apr. 9, 2014

(87) PCT Pub. No.: WO2012/089242
PCT Pub. Date: Jul. 5, 2012

(65) Prior Publication Data
US 2014/0220934 A1    Aug. 7, 2014

(51) Int. Cl.
| | | |
|---|---|---|
| *H04W 12/08* | (2009.01) | |
| *H04W 16/26* | (2009.01) | |
| *H04B 7/15* | (2006.01) | |
| *H04B 7/155* | (2006.01) | |
| *H04B 7/26* | (2006.01) | |
| *H04L 29/06* | (2006.01) | |

(52) U.S. Cl.
CPC .............. *H04W 12/08* (2013.01); *H04B 7/15* (2013.01); *H04B 7/15507* (2013.01); *H04B 7/2606* (2013.01); *H04W 16/26* (2013.01); *H04L 63/104* (2013.01)

(58) Field of Classification Search
CPC ... H04W 84/047; H04W 16/26; H04W 92/20; H04W 12/06; H04W 16/28
See application file for complete search history.

(56) References Cited

U.S. PATENT DOCUMENTS

| | | | | |
|---|---|---|---|---|
| 2013/0016330 | A1* | 1/2013 | Yun et al. ................. | 355/67 |
| 2013/0053048 | A1* | 2/2013 | Garcia et al. .............. | 455/450 |
| 2013/0273890 | A1* | 10/2013 | Du et al. .................... | 455/411 |
| 2014/0301371 | A1* | 10/2014 | Maeda et al. .............. | 370/331 |

FOREIGN PATENT DOCUMENTS

WO    WO 2010/113528 A1    10/2010

OTHER PUBLICATIONS

3GPP TSG-RAN WG3 #69bis, Xi'an, China, Oct. 11-15, 2010, R3-102907, "GW Selection for Relay", Qualcomm Inc 3 pgs.
3GPP TSG RAN WG3#70, Jacksonville, US, Nov. 15-19, 2010, R3-103393, "How to differentiate two phases of RN startup procedure", CATT, 3 pgs.
3GPP TSG-RAN WG3 #70, Jacksonville, USA, Nov. 15-19, 2010, R3-103410, LTE_Relay-Core, Qualcomm Inc., 12 pgs.
ETSI TS 136 413 V9.4.0 (Oct. 2010), "LTE; Evolved Universal Terrestrial Radio Access Network (E-UTRAN); S1 Application Protocol 9S1AP) (3GPP TS 36.413 version 9.4.0 Release 9)", 244 pgs.

* cited by examiner

*Primary Examiner* — Diane Mizrahi
(74) *Attorney, Agent, or Firm* — Harrington & Smith

(57) ABSTRACT

There are provided measures for access control of a relay node with a closed subscriber group, said measures exemplarily comprising retrieval of setting information relating to a closed subscriber group of a base station function of a relay node, said relay node requesting access to a relay-enhanced cellular system via a donor base station, acquisition of setting information relating to a closed subscriber group of the donor base station, and execution of access control of the base station function of the relay node based on the setting information relating to the closed subscriber groups of the base station function of the relay node and the donor base station.

23 Claims, 11 Drawing Sheets

ACCESS CONTROL OF RELAY NODE WITH CLOSED SUBSCRIBER GROUP

FIELD OF THE INVENTION

The present invention relates to access control of a relay node with a closed subscriber group.

BACKGROUND OF THE INVENTION

In the development of radio communication systems, such as mobile communication systems (like for example GSM (Global System for Mobile Communication), GPRS (General Packet Radio Service), UMTS (Universal Mobile Telecommunication System) or the like), efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved radio access networks (like for example the Evolved Universal Terrestrial Radio Access Network (E-UTRAN)) or as being part of a long-term evolution (LTE) or LTE-Advanced. Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) or LTE-Advanced is taken as a non-limiting example for a broadband radio access network being applicable in the context of the present invention and its embodiments. However, it is to be noted that any kind of radio access network may likewise be applicable, as long as it exhibits comparable features and characteristics as described hereinafter.

In the development of cellular systems in general, and access networks in particular, relaying has been proposed as one concept. In relaying, a terminal or user equipment (UE) is not directly connected with an access node such as a radio base station (e.g. denoted as eNodeB or eNB) of a radio access network (RAN), but via a relay node (RN) which is connected to the access node. Relaying by way of relay nodes has been proposed as a concept for coverage extension in cellular systems. Apart from this main goal of coverage extension, introducing relay concepts can also help in providing high-bitrate coverage in high shadowing environments, reducing the average radio-transmission power at the a user equipment (thereby leading to long battery life), enhancing cell capacity and effective throughput, (e.g. increasing cell-edge capacity and balancing cell load), and enhancing overall performance and deployment cost of radio access networks.

FIG. 1 shows a schematic diagram of a typical deployment scenario of a relay-enhanced cellular system, such as e.g. a LTE or LTE-Advanced RAN with radio-relayed extensions, for which exemplary embodiments of the present invention are applicable. As shown in FIG. 1, UEs at disadvantaged positions such as a cell edge and/or high shadowing areas are connected to a so-called donor base station (DeNB) via a respective relay node RN. Generally, any one of the relay nodes may be stationary/fixed or mobile.

The coverage or service area of a relay node may be referred to as relay cell, and the coverage or service area of a donor base station may be referred to as donor cell. Accordingly, both the DeNB as well as the RNs may be regarded as access nodes or base stations of an access network, possibly as access nodes or base stations of different hierarchical level in terms of logical and/or structural network deployment.

In a relay-enhanced cellular system, a relay node acts as a user equipment (UE) from the point of view of its serving donor base station (DeNB) and as a base station (eNB) from the point of view of its served user equipment or terminal (UE) of an actual user. Accordingly, a relay node supports both UE and eNB functionality and, thus, incorporates both UE and eNB functions. In the following, the user equipment (UE) function of a relay node is denoted by RN-UE, and the base station (eNB) function of a relay node is denoted as RN-eNB. This is indicated e.g. in FIG. 2 below.

FIG. 2 shows a schematic diagram of a system architecture of a relay-enhanced cellular system, such as e.g. a LTE or LTE-Advanced RAN with radio-relayed extensions, for which exemplary embodiments of the present invention are applicable. As shown in FIG. 2, further network entities and/or functions are involved, such as a mobility management entity/function (MME) for the RN-UE function and the user terminal, a serving gateway (SGW) and a packet data network gateway (PGW) entity/function for the RN-UE function and the user terminal, as well as an optional relay gateway (GW) entity/function. While various alternative implementations are conceived (being indicated the blocks denoted as Alt. 1, Alt. 2 and Alt. 3), the implementation according to Alt. 2 is currently specified as standard.

The individual entities/functions are linked by specified interfaces indicated between respective blocks in FIG. 2. In particular, the (wireless) link between donor base station (DeNB) and relay node (RN) is referred to as Un link or relay link, and the (wireless) link between the relay node (RN) and the terminal or user equipment (UE) is referred to as Uu link or access link.

In the development of cellular systems in general, and access networks in particular, the concept of closed subscriber group (CSG) has been proposed. For example, in current 3GPP specifications, CSGs are applicable for home base stations (H(e)NBs) or femtocells as well as macro base stations ((e)NBs) or macrocells. A cell with a closed subscriber group (CSG), also referred to as CSG cell is only allowed to be accessed by a terminal or user equipment when this terminal or user equipment is a member of the CSG of that cell or, stated in other words, is a member of that cell. In this regard, the parameters csg-indication and csg-identity are defined as CSG-related parameters for handling and managing access of CSG cells. The parameter csg-indication indicates whether or not a cell is a CSG cell, and the parameter csg-identity defines the identity of the CSG within the cellular system the cell belongs to. When csg-indication is set to TRUE for a specific cell, the terminal or user equipment is only allowed to access this cell, if the csg-identity matches an entry in the CSG whitelist of the terminal or user equipment. That is, in the context of CSGs, a specific CSG-based access control for a terminal or user equipment is required and specified from both UE side and network side.

The concept of closed subscriber group is generally applicable to relay-enhanced cellular systems. In such case, any relay cell may be a CSG cell or not, and any donor cell may be a CSG cell or not. The CSG-related parameters of the individual cells may be transferred by being included in System Information Block 1 (SIB1) according to current specifications so as to be advertised between relay node and donor base station.

While current specifications of CSG-based access control are applicable for a relay node when acting as a user equipment towards the network side, problems arise regarding the base station function of a relay node. Moreover, additional problems arise when the relay node (i.e. its base station function) has a closed subscriber group itself. That is, with specifications of CSG-based access control, problems arise in the access control of a relay node, in particular when a CSG is introduced both at the relay node and the donor base station, the two CSGs potentially exhibiting different settings, such as CSG ID and/or access mode (wherein the access mode could e.g. be hybrid/closed/open).

The above-mentioned problems are explained hereinafter.

FIG. 3 shows a schematic diagram of an exemplary deployment scenario of a relay-enhanced cellular system where both DeNB and RN represent CSG cells with different settings.

As shown in FIG. 3, both the DeNB and the RN represent CSG cells but with different CSG identities. A conceivable scenario of such deployment situation may for example be in an office or enterprise environment, where the DeNB is deployed to provide coverage to the whole building, while the RN is implemented in each floor or department to serve the staff on the specific floor or of the specific department only.

As described before, the RN combines both UE function and eNB function. Given this special feature of a relay node, for the access control, it cannot be considered just as a normal UE, because it provides network service (as an eNB) to other normal UE(s). It has been agreed in 3GPP that the RN should indicate to the network that it is a RN, if it would act as a. RN instead of normal UE, and the network side would confirm the RN identity based on the subscription info of the RN.

In current specifications, there is no consideration of an introduction of CSGs into relay systems. Hence, the currently discussed RN access control mechanism does not consider any CSG factors. Therefore, the existing CSG-based access control mechanisms specified for normal UEs will face some problems when applied for relay nodes because it does not consider the feature of the eNB function of the relay node but only its UE function.

In case a RN attaches to the network as (RN-)UE, the access control is performed by the MME based on the subscribed CSG list of the (RN-)UE and the CSG settings (i.e. CSG ID and access mode) of the accessed cell, i.e. the DeNB cell. After the RN passed the access control as a UE, the network activates the Un link. After that time, the RN acts as a RN and provides networks service to other UEs. Because no additional considerations of the CSG settings of the RN (i.e. the RN-eNB) where done before, when the DeNB was performing access control to the RN, it is possible that the RN provides network service to other UEs permitted based on the RN's CSG settings but not permitted based on the DeNB's CSG settings, which is because of the difference between the CSG settings of the DeNB and RN cells. For example, the DeNB cell may be configured with a CSG, while the RN cell may be configured with an open CSG or hybrid CSG.

In view thereof, there do not exist any feasible mechanisms for properly and correctly handling access control of a relay node with a closed subscriber group, in particular in case of layered CSG cells where a CSG cell is part of a relay node that itself is in a CSG cell of a donor base station, the layered CSG cells potentially exhibiting difference CSG settings.

Accordingly, mechanisms are needed for access control of a relay node with a closed subscriber group, in particular in case of layered CSG cells where a CSG cell is part of a relay node that itself is in a CSG cell of a donor base station, the layered CSG cells potentially exhibiting difference CSG settings.

SUMMARY OF EMBODIMENTS OF THE INVENTION

The present invention and its embodiments aim at solving or at least mitigating above-mentioned problems and drawbacks of the background art.

The present invention and its embodiments are made to provide for mechanisms for access control of a relay node with a closed subscriber group.

According to an exemplary first aspect of the present invention, there is provided a method comprising retrieving setting information relating to a closed subscriber group of a base station function of a relay node, said relay node requesting access to a relay-enhanced cellular system via a donor base station, acquiring setting information relating to a closed subscriber group of the donor base station, and performing access control of the base station function of the relay node based on the setting information relating to the closed subscriber groups of the base station function of the relay node and the donor base station.

According to further developments or modifications thereof, one or more of the following applies:

the setting information comprise at least one of an identity of the closed subscriber group and an access mode of the base station function of the relay node and the donor base station, respectively, the closed subscriber group of the base station function of the relay node is one of a plurality of closed subscriber groups of the relay node, which is selected on the basis of at least one of location of the relay node, the donor base station, policy of operator, and temporal conditions, the access control of the base station function of the relay node is successful, when the setting information relating to the closed subscriber groups of the base station function of the relay node and the donor base station are compatible in terms of at least one of identity, access mode, and members, the method is operable at or by a mobility management entity of a user equipment function of the relay node, in this case:

the method further comprises performing access control of the user equipment function of the relay node based on the setting information relating to the closed subscriber group of the donor base station and a whitelist defining one or more closed subscriber groups in which the user equipment function of the relay node is a member, wherein the access control of the user equipment function of the relay node is successful, when the user equipment function of the relay node is a member of the closed subscriber group of the donor base station, the method further comprises sending an attach accept message to the donor base station and/or the relay node when both the access control of the base station function of the relay node and the access control of the user equipment function of the relay node are successful, or sending an attach reject message to the donor base station and/or the relay node when at least one of the access control of the base station function of the relay node and the access control of the user equipment function of the relay node is not successful, the retrieving and the acquiring comprise receiving the setting information relating to the closed subscriber groups of the base station function of the relay node and the donor base station from the donor base station, the setting information relating to the closed subscriber group of the base station function of the relay node is included in an attach request message, the retrieving comprises fetching the setting information relating to the closed subscriber group of the base station function of the relay node from a home subscriber system storing the setting information relating to the closed subscriber group of the base station function of the relay node as part of subscription information of the user equipment function of the relay node, the acquiring comprises receiving the setting information relating to the closed subscriber group of the donor base station from the donor base station, the method further comprises receiving an attach request message from the donor base station.

the method is operable at or by the donor base station, in this case:

the retrieving comprises receiving the setting information relating to the closed subscriber group of the base station function of the relay node from the relay node, the setting information relating to the closed subscriber group of the base station function of the relay node is included in a connection request message, the acquiring comprises locally obtaining the setting information relating to the closed subscriber group of the donor base station from a local storage of the donor base station, the method further comprises sending a connection setup message to the relay node when the access control of the base station function of the relay node is successful, or sending a connection reject message to the relay node when the access control of the base station function of the relay node is not successful, and/or the donor base station and/or the relay node is part of an evolved radio access network in accordance with LTE and/or LTE-Advanced specifications.

According to an exemplary second aspect of the present invention, there is provided an apparatus comprising a processor configured to retrieve setting information relating to a closed subscriber group of a base station function of a relay node, said relay node requesting access to a relay-enhanced cellular system via a donor base station, acquire setting information relating to a closed subscriber group of the donor base station, and perform access control of the base station function of the relay node based on the setting information relating to the closed subscriber groups of the base station function of the relay node and the donor base station.

According to further developments or modifications thereof, one or more of the following applies:

the setting information comprise at least one of an identity of the closed subscriber group and an access mode of the base station function of the relay node and the donor base station, respectively, the closed subscriber group of the base station function of the relay node is one of a plurality of closed subscriber groups of the relay node, which is selected on the basis of at least one of location of the relay node, the donor base station, policy of operator, and temporal conditions, the access control of the base station function of the relay node is successful, when the setting information relating to the closed subscriber groups of the base station function of the relay node and the donor base station are compatible in terms of at least one of identity, access mode, and members, the apparatus is operable as or at a mobility management entity of a user equipment function of the relay node, in this case:

the processor is further configured to perform access control of the user equipment function of the relay node based on the setting information relating to the closed subscriber group of the donor base station and a whitelist defining one or more closed subscriber groups in which the user equipment function of the relay node is a member, wherein the access control of the user equipment function of the relay node is successful, when the user equipment function of the relay node is a member of the closed subscriber group of the donor base station, the apparatus further comprises a transmitter configured to and/or the processor is further configured to send an attach accept message to the donor base station and/or the relay node when both the access control of the base station function of the relay node and the access control of the user equipment function of the relay node are successful, or to send an attach reject message to the donor base station and/or the relay node when at least one of the access control of the base station function of the relay node and the access control of the user equipment function of the relay node is not successful, the apparatus further comprises a receiver configured to and/or the processor, for retrieving and acquiring, is further configured to receive the setting information relating to the closed subscriber groups of the base station function of the relay node and the donor base station from the donor base station, the setting information relating to the closed subscriber group of the base station function of the relay node is included in an attach request message, the apparatus further comprises a receiver configured to and/or the processor, for retrieving, is further configured to fetch the setting information relating to the closed subscriber group of the base station function of the relay node from a home subscriber system storing the setting information relating to the closed subscriber group of the base station function of the relay node, as part of subscription information of the user equipment function of the relay node, the apparatus further comprises a receiver configured to and/or the processor, for acquiring, is further configured to receive the setting information relating to the closed subscriber group of the donor base station from the donor base station, the apparatus further comprises a receiver configured to and/or the processor is further configured to receive an attach request message from the donor base station, the apparatus is operable as or at the donor base station, the apparatus further comprises a receiver configured to and/or the processor, for retrieving, is further configured to receive the setting information relating to the closed subscriber group of the base station function of the relay node from the relay node, the setting information relating to the closed subscriber group of the base station function of the relay node is included in a connection request message, the processor, for acquiring, is further configured to locally obtain the setting information relating to the closed subscriber group of the donor base station from a local storage of the donor base station, the apparatus further comprises a transmitter configured to and/or the processor is further configured to send a connection setup message to the relay node when the access control of the base station function of the relay node is successful, or to send a connection reject message to the relay node when the access control of the base station function of the relay node is not successful, and/or the donor base station and/or the relay node is part of an evolved radio access network in accordance with LTE and/or LTE-Advanced specifications.

According to an exemplary third aspect of the present invention, there is provided a method comprising providing setting information relating to a closed subscriber group of a base station function of a relay node for access control of the base station function of the relay node, said relay node requesting access to a relay-enhanced cellular system via a donor base station having a closed subscriber group.

According to further developments or modifications thereof, one or more of the following applies:

the setting information comprise at least one of an identity of the closed subscriber group and an access mode of the base station function of the relay node, the closed subscriber group of the base station function of the relay node is one of a plurality of closed subscriber groups of the relay node, which is selected on the basis of at least one of location of the relay node, policy of operator, the donor base station, and temporal conditions, the method is operable at or by the relay node, in this case:

the method further comprises receiving setting information relating to the closed subscriber group of the donor base station, performing a suitability check of a user equipment function of the relay node based on the setting information relating to the closed subscriber group of the donor base station and a whitelist defining one or more closed subscriber groups in which the user equipment function of the relay node is a member, and performing a suitability check of the base station function of the relay node based on the setting information relating to the closed subscriber groups of the base station function of the relay node and the donor base station, the providing is performed only when both suitability checks are successful such that the user equipment function of the relay node is a member of the closed subscriber group of the donor base station and the setting information relating to the closed subscriber group of the base station function of the relay node and the donor base station are compatible in terms of at least one of identity, access mode, and members, the providing comprises transmitting the setting information relating to the closed subscriber group of the base station function of the relay node to the donor base station, the method further comprises activating the base station function of the relay node upon receipt of an attach accept message, or rejecting access of the relay node upon receipt of an attach reject message.

the setting information relating to the closed subscriber group of the base station function of the relay node is included in an attach request message, the setting information relating to the closed subscriber group of the base station function of the relay node is included in connection request message.

the method, is operable at or by the donor base station, in this case:

the method further comprises receiving the setting information relating to the closed subscriber group of the base station function of the relay node from the relay node, the providing comprises transmitting the setting information relating to the closed subscriber group of the base station function of the relay node to a mobility management entity of a user equipment function of the relay node, the setting information relating to the closed subscriber group of the base station function of the relay node is included in an attach request message, the method is operable at or by a home subscriber system, in this case:

the providing comprises transmitting the setting information relating to the closed subscriber group of the base station function of the relay node to a mobility management entity of a user equipment function of the relay node, the setting information relating to the closed subscriber group of the base station function of the relay node is included in subscription information of the user equipment function of the relay node, the method further comprises receiving a request for fetching the setting information relating to the closed subscriber group of the base station function of the relay node from the mobility management entity, and locally obtaining the setting information relating to the closed subscriber group of the base station function of the relay node from a local storage storing the setting information relating to the closed subscriber group of the base station function of the relay node as part of subscription information of the user equipment function of the relay node, the donor base station and/or the relay node is, part of an evolved radio access network in accordance with LTE and/or LTE-Advanced specifications.

According to an exemplary fourth aspect of the present invention, there is provided an apparatus comprising a processor configured to provide setting information relating to a closed subscriber group of a base station function of a relay node for access control of the base station function of the relay node, said relay node requesting access to a relay-enhanced cellular system via a donor base station having a closed subscriber group.

According to further developments or modifications thereof, one or more of the following applies: . . .

the setting information comprise at least one of an identity of the closed subscriber group and an access mode of the base station function of the relay node, the closed subscriber group of the base station function of the relay node is one of a plurality of closed subscriber groups of the relay node, which is selected on the basis of at least one of location of the relay node, policy of operator, the donor base station, and temporal conditions, the apparatus is operable as or at the relay node, in this case:

the apparatus further comprises a receiver configured to and/or the processor is further configured to receive setting information relating to the closed subscriber group of the donor base station, the processor is further configured to perform a suitability check of a user equipment function of the relay node based on the setting information relating to the closed subscriber group of the donor base station and a whitelist defining one or more closed subscriber groups in which the user equipment function of the relay node is a member, the processor is further configured to perform a suitability check of the base station function of the relay node based on the setting information relating to the closed subscriber groups of the base station function of the relay node and the donor base station, the processor is further configured to perform the providing only when both suitability checks are successful such that the user equipment function of the relay node is a member of the closed subscriber group of the donor base station and the setting information relating to the closed subscriber group of the base station function of the relay node and the donor base station are compatible in terms of at least one of identity, access mode, and members, the apparatus further comprises a transmitter configured to and/or the processor, for providing, is further configured to transmit the setting information relating to the closed subscriber group of the base station function of the relay node to the donor base station, the processor is further configured to activate the base station function of the relay node upon receipt of an attach accept message or a connection setup message, or reject access of the relay node upon receipt of an attach reject message or a connection reject message, the setting information relating to the closed subscriber group of the base station function of the relay node is included in an attach request message, the setting information relating to the closed subscriber group of the base station function of the relay node is included in connection request message, the apparatus is operable as or at the donor base station, the apparatus further comprises a receiver configured to and/or the processor is further configured to receive the setting information relating to the closed subscriber group of the base station function of the relay node from the relay node, the apparatus further comprises a transmitter configured to and/or the processor, for providing, is further configured transmit the setting information relating to the closed subscriber group of the base*station function of the relay node to a mobility management entity of a user equipment function of the relay node, the setting information relating to the closed subscriber group of the base station function of the relay node is included in an attach request message, the apparatus is operable as or at a home subscriber system, in this case:

the apparatus further comprises a transmitter configured to and/or the processor, for providing, is further configured to transmit the setting information relating to the closed subscriber group of the base station function of the relay node to a mobility management entity of a user equipment function of the relay node, the setting information relating to the closed subscriber group of the base station function of the relay node is included in subscription information of the user equipment function of the relay node, the apparatus further comprises a receiver configured to and/or the processor is further configured to receive a request for fetching the setting information relating to the closed subscriber group of the base station function of the relay node from the mobility management entity, the processor is further configured to locally obtain the setting information relating to the closed subscriber group of the base station function of the relay node from a local storage storing the setting information relating to the closed subscriber group of the base station function of the relay node as part of subscription information of the user equipment function of the relay node, and/or the donor base station and/or the relay node is part of an evolved radio access network in accordance with LTE and/or LTE-Advanced specifications.

According to an exemplary fifth aspect of the present invention, there is provided a method comprising procuring setting information relating to a closed subscriber group of a base station function of a relay node, said relay node requesting access to a relay-enhanced cellular system via a donor base station, receiving setting information relating to a closed subscriber group of the donor base station, performing a suitability check of the base station function of the relay node based on the setting information relating to the closed subscriber groups of the base station function of the relay node and the donor base station, and initiating an access to the relay-enhanced cellular system via the donor base station when the suitability check is successful such that the setting information relating to the closed subscriber group of the base station function of the relay node and the donor base station are compatible in terms of at least one of identity, access mode, and members.

According to further developments or modifications thereof, one or more of the following applies:

the method further comprises performing a suitability check of a user equipment function of the relay node based on the setting information relating to the closed subscriber group of the donor base station and a whitelist defining one or more closed subscriber groups in which the user equipment function of the relay node is a member, the access initiation is performed only when both suitability checks are successful such that the user equipment function of the relay node is a member of the closed subscriber group of the donor base station and the setting information relating to the closed subscriber group of the base station function of the relay node and the donor base station are compatible in terms of at least one of identity, access mode, and members, the network initiation comprises providing the setting information relating to a closed subscriber group of abase station function of a relay node to the relay-enhanced cellular system, the providing comprises transmitting the setting information relating to the closed subscriber group of the base station function of the relay node to the donor base station, the method further comprises activating the base station function of the relay node upon receipt of an attach accept message or a connection setup message, or rejecting access of the relay node upon receipt of an attach reject message or a connection reject message, the setting information comprise at least one of an identity of the closed subscriber group and an access mode of the base station function of the relay node, the closed subscriber group of the base station function of the relay node is one of a plurality of closed subscriber groups of the relay node, which is selected on the basis of at least one of location of the relay node, policy of operator, the donor base station, and temporal conditions, the setting information relating to the closed subscriber group of the base station function of the relay node is included in an attach request message, or the setting information relating to the closed subscriber group of the base station function of the relay node is included in connection request message, the method is operable at or by the relay node, and/or the donor base station and/or the relay node is part of an evolved radio access network in accordance with LTE and/or LTE-Advanced specifications.

According to an exemplary sixth aspect of the present invention, there is provided an apparatus comprising a receiver and/or a processor configured to receive setting information relating to a closed subscriber group of the donor base station, and a processor configured to procure setting information relating to a closed subscriber group of a base station function of a relay node, said relay node requesting access to a relay-enhanced cellular system via a donor base station, perform a suitability check of the base station function of the relay node based on the setting information relating to the closed subscriber groups of the base station function of the relay node and the donor base station, and initiate an access to the relay-enhanced cellular system via the donor base station when the suitability check is successful such that the setting information relating to the closed subscriber group of the base station function of the relay node and the donor base station are compatible in terms of at least one of identity, access mode, and members.

According to further developments or modifications thereof, one or more of the following applies:

the processor is further configured to perform a suitability check of a user equipment function of the relay node based on the setting information relating to the closed subscriber group of the donor base station and a whitelist defining one or more closed subscriber groups in which the user equipment function of the relay node is a member, the processor is further configured to perform the access initiation only when both suitability checks are successful such that the user equipment function of the relay node is a member of the closed subscriber group of the donor base station and the setting information relating to the closed subscriber group of the base station function of the relay node and the donor base station are compatible in terms of at least one of identity, access mode, and members, the processor, for access initiation, is further configured to provide the setting information relating to a closed subscriber group of a base station function of a relay node to the relay-enhanced cellular system, the apparatus further comprises a transmitter configured to and/or the processor, for providing, is further configured to transmit the setting information relating to the closed subscriber group of the base station function of the relay node to the donor base station, the processor is further configured to activate the base station function of the relay node upon receipt of an attach accept message or a connection setup message, or to reject access of the relay node upon receipt of an attach reject message or a connection reject message, the setting information comprise at least one of an identity of the closed subscriber group and an access mode of the base station function of the relay node, the closed subscriber group of the base station function of the relay node is one of a plurality of closed subscriber groups of the relay node, which is selected on the basis of at least one of location of the relay node, policy of operator, the donor base station, and temporal conditions, the setting information relating to the closed subscriber group of the base station function of the relay node is included in an attach request message, or the setting information relating to the closed subscriber group of the base station function of the relay node is included in connection request message, the apparatus is operable as or at the relay node, and/or the donor base station and/or the relay node is part of an evolved radio access network in accordance with LTE and/or LTE-Advanced specifications.

According to an exemplary seventh aspect of the present invention, there is provided a computer program product including a program comprising software code portions being arranged, when run on a processor of an apparatus (such as e.g. according to the above second aspect and/or developments or modifications thereof), to perform the method according to the above first aspect and/or developments or modifications thereof.

According to an exemplary eighth aspect of the present invention, there is provided a computer program product including a program comprising software code portions being arranged, when run on a processor of an apparatus (such as e.g. according to the above fourth aspect and/or developments or modifications thereof), to perform the method according to the above third aspect and/or developments or modifications thereof.

According to an exemplary ninth aspect of the present invention, there is provided a computer program product including a program comprising software code portions being arranged, when run on a processor of an apparatus (such as e.g. according to the above sixth aspect and/or developments or modifications thereof), to perform the method according to the above fifth aspect and/or developments or modifications thereof.

According to further developments or modifications thereof, the computer program product according to the seventh, eighth or ninth aspect comprises a computer-readable medium on which the software code portions are stored, and/or the program is directly loadable into a memory of the processor.

By way of exemplary embodiments of the present invention, there are provided mechanisms for access control of a relay node with a closed subscriber group. Such measures are particularly beneficial in case of layered CSG cells where a CSG cell is part of a relay node that itself is in a CSG cell of a donor base station, the layered CSG cells potentially exhibiting differences in their CSG settings.

By way of exemplary embodiments of the present invention, both CSG restrictions of relay and donor cells may be properly considered in relay node access control. Accordingly, by way of exemplary embodiments of the present invention, a comprehensive combination of relay systems with the CSG concept is facilitated.

By way of exemplary embodiments of the present invention, there are provided mechanisms for facilitating relay node access control (i.e. assuring a proper CSG handling in relay node access control) via a donor base station in a relay-enhanced system supporting closed subscriber groups for relay and donor cells. Accordingly, by way of exemplary embodiments of the present invention, it may be verified during relay node access control that the CSG parameters in the RN cell are compatible with the CSG parameters in the DeNB cell, thus ensuring that a relay node may only be successfully connected to a donor base station when the CSG parameters in the RN cell are compatible with the CSG parameters in the DeNB cell.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

The present invention and its embodiments are mainly described in relation to 3GPP specifications being used as non-limiting examples for certain exemplary network configurations and deployments. In particular, an LTE (E-UTRAN) radio access network and corresponding standards (LTE releases 8, 9 and LTE-Advanced release 10 and beyond) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

In particular, embodiments of the present invention may be applicable in any relay-enhanced cellular system such as for example in any relay-enhanced (cellular) access system where relay nodes/cells and donor nodes/cells exist, both being configurable as CSG cells with arbitrary CSG settings.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

Figure 1:
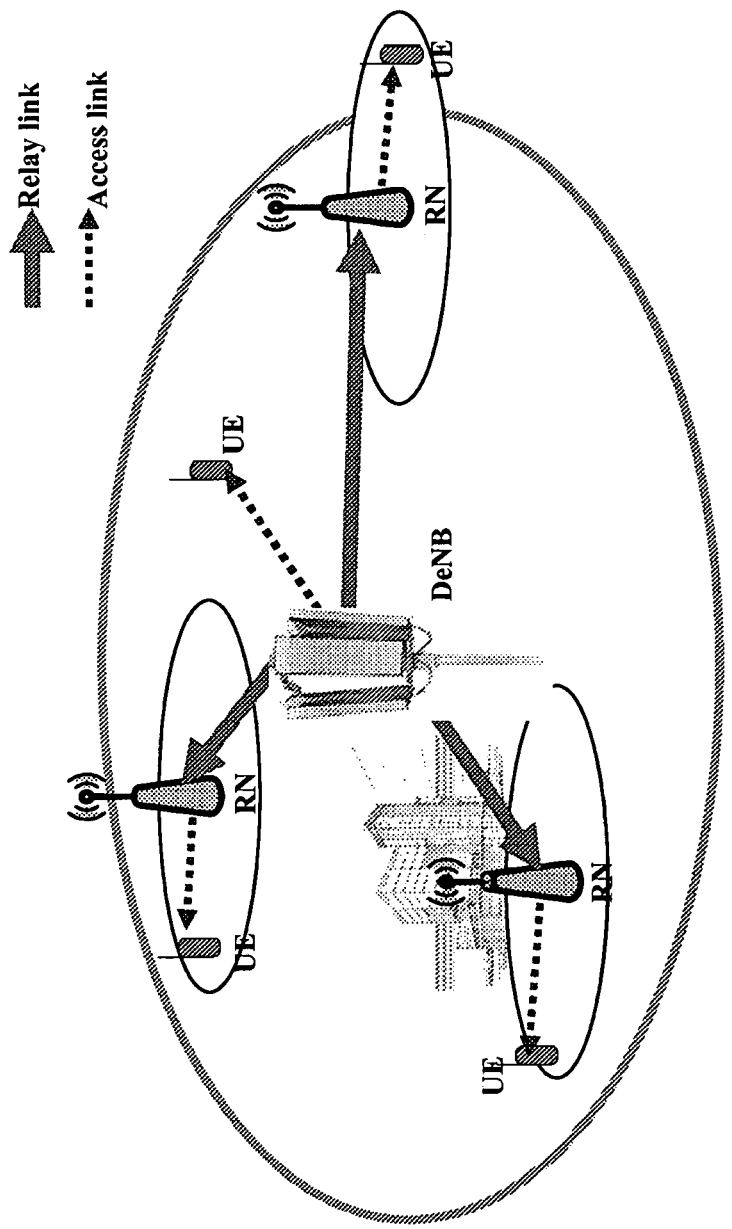
FIG. 1 shows a schematic diagram of a typical deployment scenario of a relay-enhanced cellular system for which exemplary embodiments of the present invention are applicable.
Figure 2:
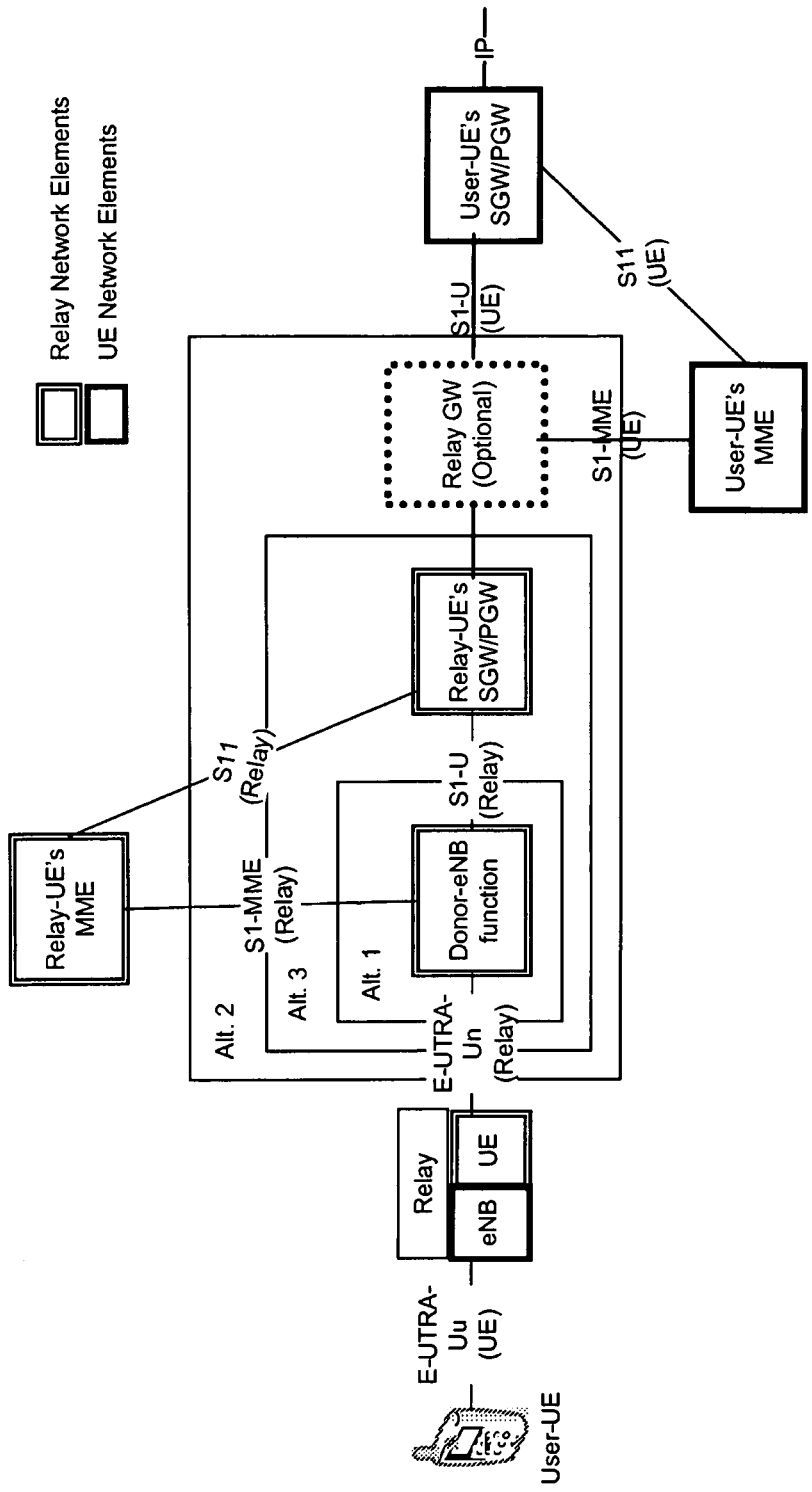
FIG. 2 shows a schematic diagram of a system architecture of a relay-enhanced cellular system for which exemplary embodiments of the present invention are applicable.
Figure 3:
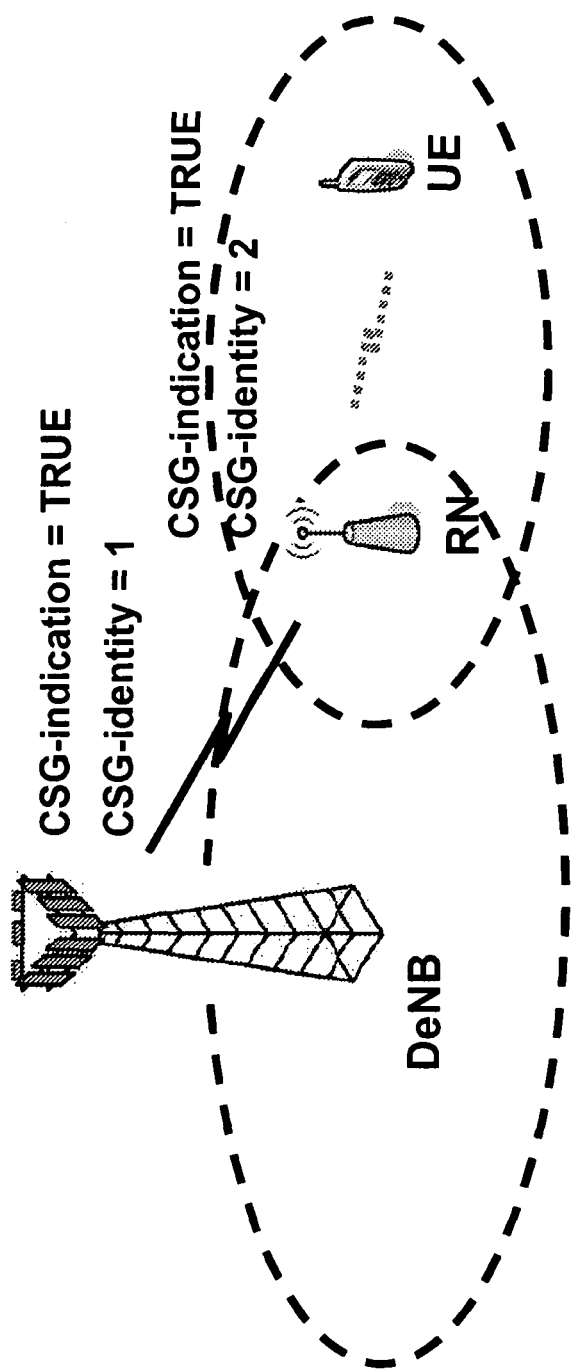
FIG. 3 shows a schematic diagram of an exemplary deployment scenario of a relay-enhanced cellular system where both DeNB and RN represent CSG cells with different settings.

For the description of exemplary embodiments of the present invention, a relay-enhanced cellular system, such as that according to the exemplary illustrations of FIGS. 1 to 3, is used as an exemplary, illustrative and non-limiting basis.

According to exemplary embodiments of the present invention, in general terms, there are provided mechanisms, measures and means for a proper handling of closed subscriber groups in relay-enhanced systems, thereby enabling e.g. an appropriate and efficient relay node access control via a donor base station of a relay-enhanced access network.

For the following description, it may exemplarily be assumed that setting information relating to a closed subscriber group, i.e. CSG setting information, may comprise at least one of an identity of the closed subscriber group and an access mode of the respective entity, e.g. a (base station function of a) relay node and/or a donor base station.

In the following, exemplary embodiments of the present invention are described with reference to methods, procedures and functions, as well as with reference to structural arrangements and configurations.

Figure 4:
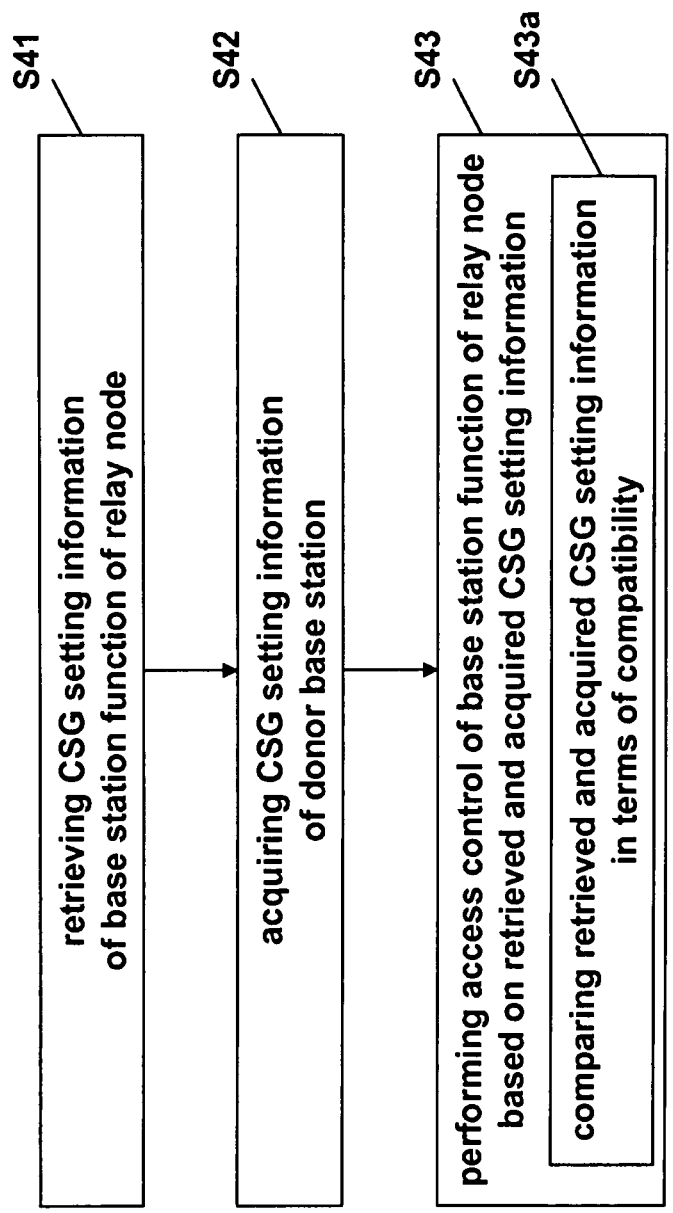
FIG. 4 shows a flowchart of an exemplary method according to exemplary embodiments of the present invention.

FIG. 4 shows a flowchart of an exemplary method according to exemplary embodiments of the present invention. The exemplary method according to FIG. 4 may be regarded as an enhanced RN access control mechanism at the network side.

Figure 6:
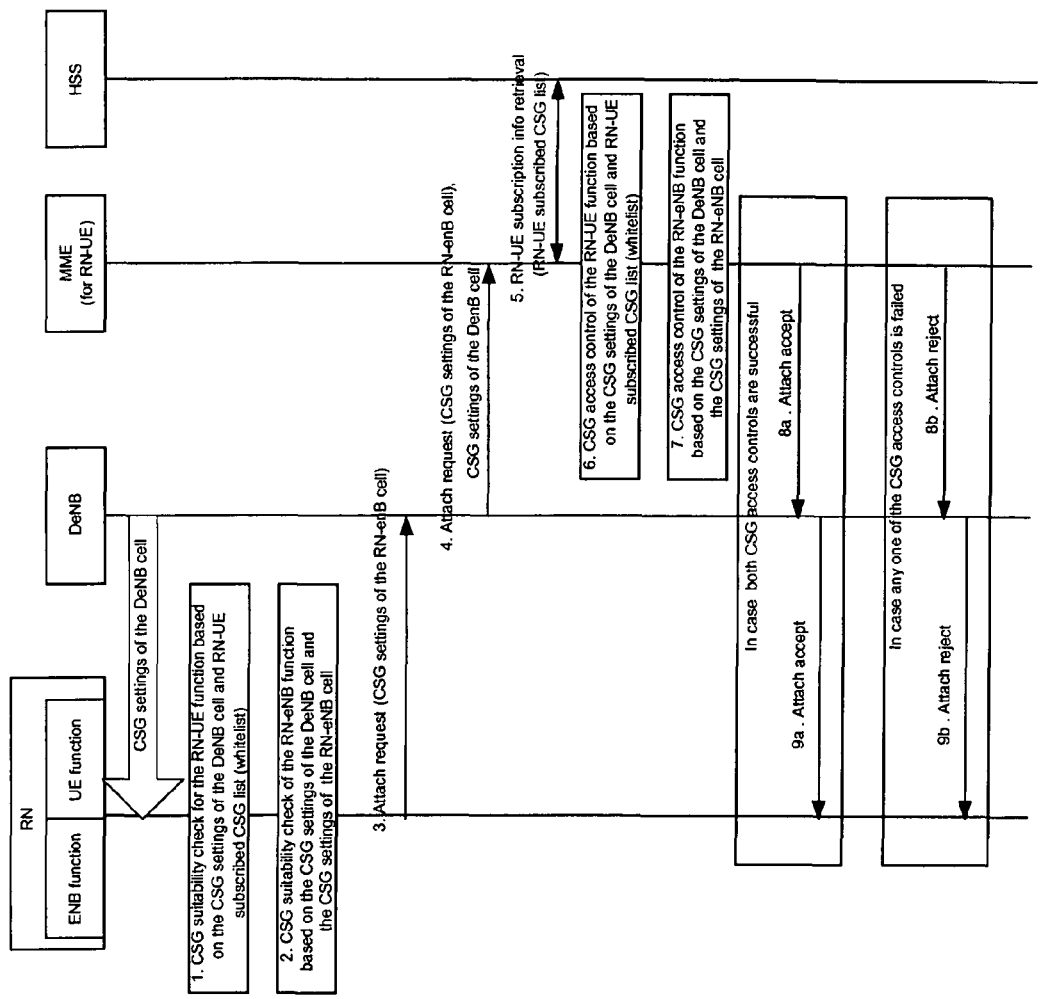
FIG. 6 shows a signaling diagram of a first exemplary procedure of relay node access control according to exemplary embodiments of the present invention.
Figure 7:
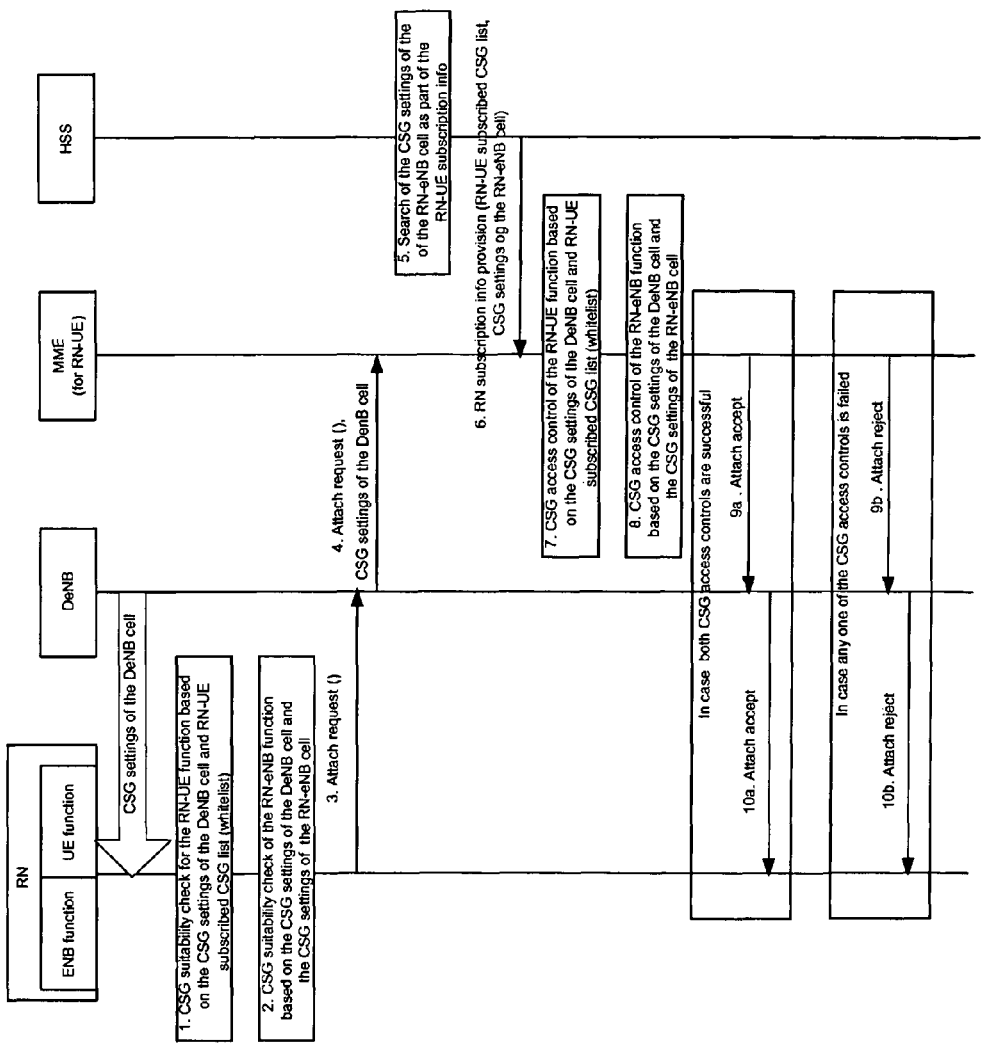
FIG. 7 shows a signaling diagram of a second exemplary procedure of relay node access control according to exemplary embodiments of the present invention.
Figure 8:
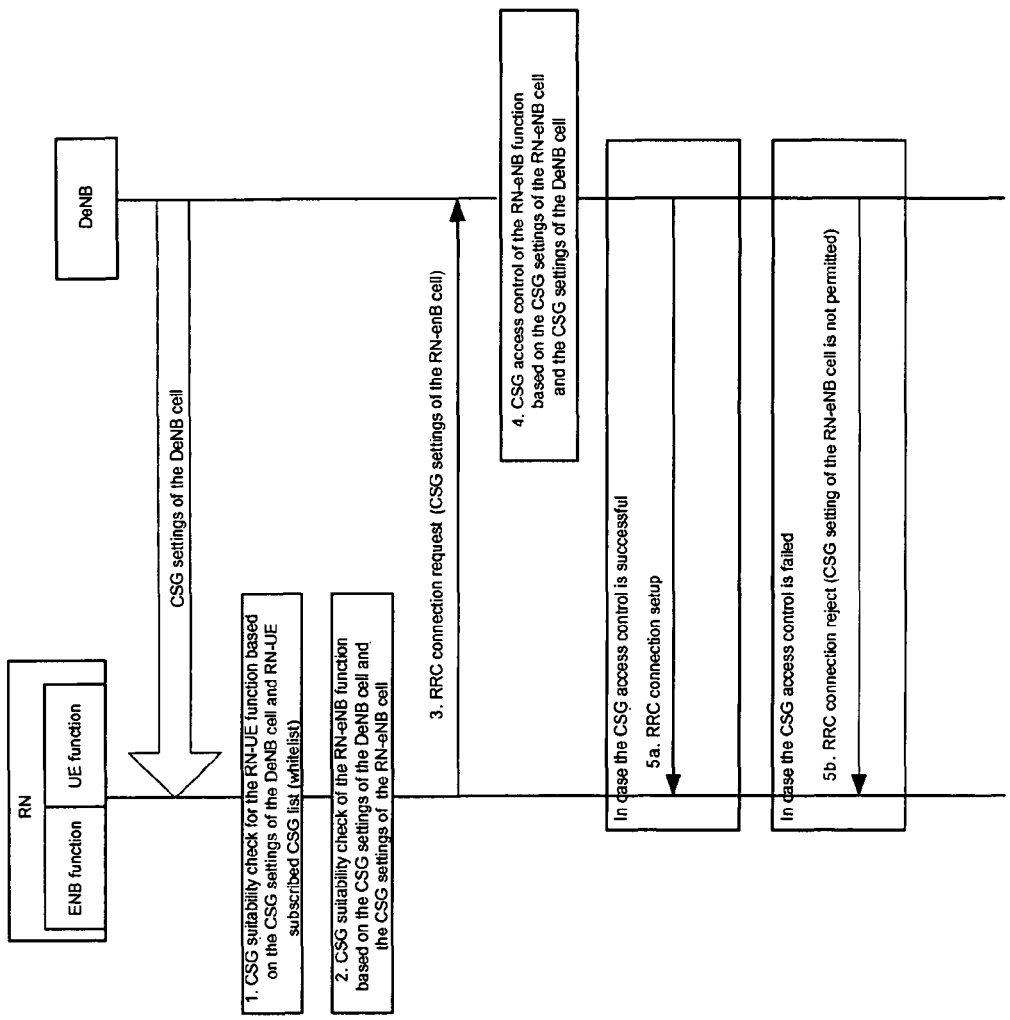
FIG. 8 shows a signaling diagram of a third exemplary procedure of relay node access control according to exemplary embodiments of the present invention.

The exemplary method according to FIG. 4 may, for example, be performed by or at a MME according to FIGS. 6 and 7, and/or a DeNB according to FIG. 8.

As shown in FIG. 4, a method according to exemplary embodiments of the present invention may comprise an operation of retrieving setting information relating to a closed subscriber group of a base station function of a relay node (S41), said relay node requesting access to a relay-enhanced cellular system via a donor base station, an operation of acquiring setting information relating to a closed subscriber group of the donor base station (S42), and an operation of performing access control of the base station function of the relay node based on the setting information relating to the closed subscriber groups of the base station function of the relay node and the donor base station (S43). The access control operation may comprise an operation of comparing the setting information relating to the closed subscriber groups of the base station function of the relay node and the donor base station in terms of compatibility and/or permission (S43a). The access control of the base station function of the relay node would be successful, when the setting information relating to the closed subscriber groups of the base station function of the relay node and the donor base station are compatible or permitted, e.g. in terms of at least one of identity, access mode, and members.

Although not shown in FIG. 4, a method according to exemplary embodiments of the present invention may further comprise an operation of performing access control of the user equipment function of the relay node based on the setting information relating to the closed subscriber group of the donor base station and a whitelist defining one or more closed subscriber groups in which the user equipment function of the relay node is a member. The access control of the user equipment function of the relay node would be successful, when the user equipment function of the relay node is a member of the closed subscriber group of the donor base station.

As a result, the access of the relay node is permitted when the one access control is or, if applicable, both access controls are successful.

Figure 5:
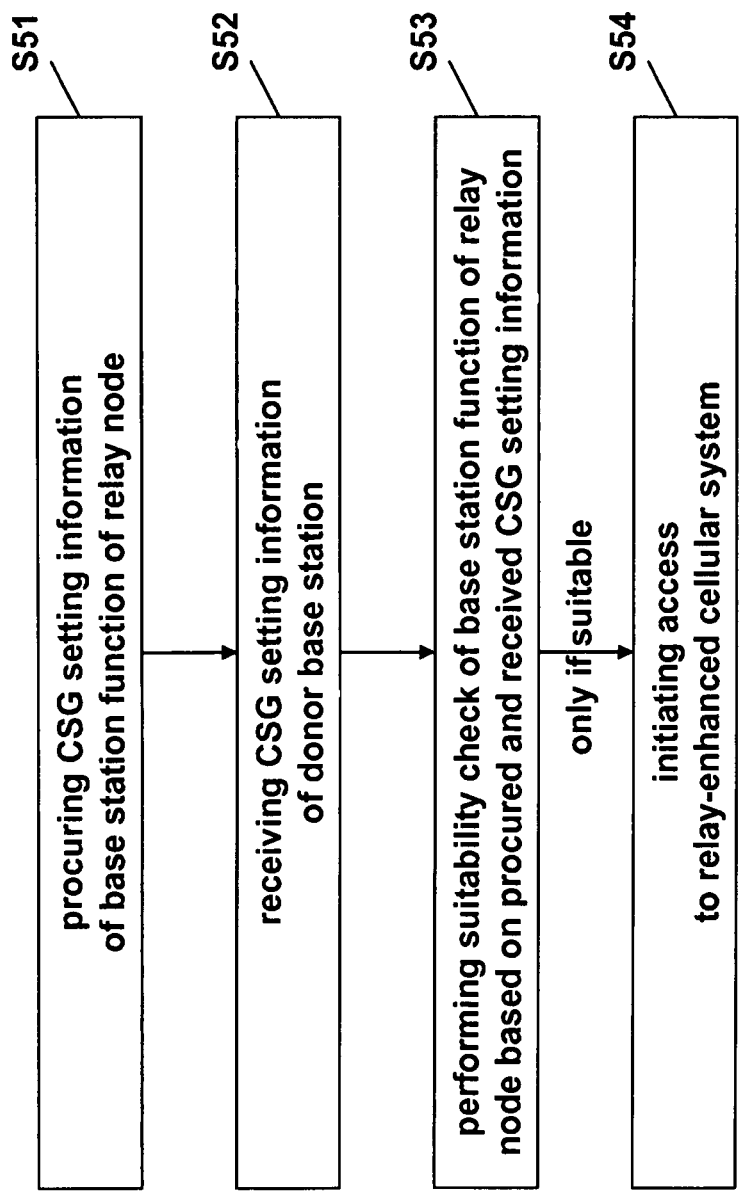
FIG. 5 shows a flowchart of another exemplary method according to exemplary embodiments of the present invention.

FIG. 5 shows a flowchart of another exemplary method according to exemplary embodiments of the present invention. The exemplary method according to FIG. 5 may be regarded as an enhanced RN access control mechanism at the UE function (RN-UE) side.

The exemplary method according to FIG. 5 may, for example, be performed by or at a RN according to FIGS. 6 to 8.

As shown in FIG. 5, a method according to exemplary embodiments of the present invention may comprise an operation of procuring setting information relating to a closed subscriber group of a base station function of a relay node, said relay node requesting access to a relay-enhanced cellular system via a donor base station (S51), an operation of receiving setting information relating to a closed subscriber group of the donor base station (S52), an operation of performing a suitability check of the base station function of the relay node based on the setting information relating to the closed subscriber groups of the base station function of the relay node and the donor base station (S53), and an operation of initiating an access to the relay-enhanced cellular system via the donor base station (S54) when the suitability check is successful such that the setting information relating to the closed subscriber group of the base station function of the relay node and the donor base station are compatible or permitted in terms of at least one of identity, access mode, and members.

Although not shown in FIG. 5, a method according to exemplary embodiments of the present invention may further comprise an operation of performing a suitability check of a user equipment function of the relay node based on the setting information relating to the closed subscriber group of the donor base station and a whitelist defining one or more closed subscriber groups in which the user equipment function of the relay node is a member.

As a result, the access initiation is performed when the one suitability check is and/or, if applicable, both suitability checks are successful.

According to embodiments of the present invention, access initiation may be accomplished by providing the setting information relating to a closed subscriber group of a base station function of a relay node to the relay-enhanced cellular system. Hence, the operation of step S54 according to FIG. 5 may comprise providing RN-eNB CSG setting information toward the network. Such initiation or provision of corresponding information may be accomplished by way of inclusion into a specific message and transmission thereof towards the network (as in the exemplary embodiments according to FIGS. 6 and 8) and/or (in an indirect manner, say logically or virtually) by way of enhanced RN-UE subscription information at the HSS (as in the exemplary embodiments according to FIG. 7).

It may be regarded that the methods according to FIGS. 4 and 5 may represent counterparts of a cooperation of different entities within a common RN access/admission control procedure according to exemplary embodiments of the present invention.

FIGS. 6 to 8 show signaling diagrams of various exemplary procedures of relay node access control according to exemplary embodiments of the present invention.

As shown in FIGS. 6 to 8, the relay node requesting access to the network performs a suitability checking operation for checking its suitability in terms of the CSG settings of the donor base station. According to embodiments of the present invention, such suitability checking operation may comprise a two-fold suitability check. That is, as shown in steps 1 and 2 of FIGS. 6 to 8, the relay node may perform a CSG suitability check with regard to its UE function RN-UE and a CSG suitability check with regard to its eNB function RN-eNB.

In this regard, the relay node has to know the CSG settings of the serving donor (DeNB) cell, which it may previously receive from the DeNB. Then, in step 1, the relay node may perform CSG suitability check with regard to its UE function RN-UE which is based on the CSG settings of the DeNB cell and the RN-UE subscriber CSG list (whitelist). Namely, it may be checked whether the RN-UE is a member of the CSG of the DeNB cell. Then, in step 2, the relay node may perform CSG suitability check with regard to its eNB function RN-eNB which is based on the CSG settings of the DeNB cell and the CSG settings of the RN-eNB cell. Namely, it may be checked whether the CSG settings of the RN-eNB are compatible with or permitted by the CSG settings of the DeNB cell. It is to be noted that, when the suitability of the RN-UE is ensured by way of a conventional technique, embodiments of the present invention basically comprise the additional suitability check with regard to the relay node's eNB function before the relay node is enabled to access the network.

In step 2, the RN may compare the detected CSG settings (e.g. CSG ID, access mode) from the surrounding DeNB with it its own CSG settings (i.e. the CSG settings of the eNB function of the RN). In case its own CSG settings are permitted by or compatible with the CSG settings of the DeNB, the RN may initiate the network access with that DeNB. For example, if the CSG ID of the RN cell is the same as that of the DeNB cell, or the CSG member/s of the RN cell CSG represent/s a subset of those of the DeNB CSG cell, the RN CSG cell may be considered as a suitable CSG cell in view of the CSG settings of the DeNB cell. Otherwise, the RN cell may not be considered as suitable.

Only if the CSG suitability checking operation is successful (in the case of FIGS. 6 to 8, if both CSG suitability checks are successful), the RN may initiate network access with the DeNB cell. Otherwise, the RN may not initiate the network access even if the CSG suitability check with regard to its UE function (without considering the eNB part) has been successful.

FIG. 6 shows a signaling diagram of a first exemplary procedure of relay node access control according to exemplary embodiments of the present invention.

As shown in FIG. 6, the MME in charge of the RN-UE performs an access control operation for the requesting RN (RN-UE from point of view of the network). According to embodiments of the present invention, such access control operation may comprise a two-fold access control or check. That is, as shown in steps 6 and 7 of FIG. 6, the MME may perform a CSG access control or check with regard to the RN-UE function and a CSG access control or check with regard to the RN-eNB function.

In this regard, required information, namely CSG settings of the RN-eNB cell and the DeNB cell, is provided by/via the RN and the DeNB, and further required information, namely the RN-UE subscribed CSG list (whitelist), is provided by/via a home subscriber system HSS (step 5) by way of the RN-UE subscription information.

As shown in FIG. 6, after successful suitability checking at the RN, the RN provides the CSG settings of the RN-eNB cell towards the network (step 3). To this end, when the RN-UE initiates the attach process to the selected DeNB as a RN (phase 2 of the specified RN attach procedure), the RN(-UE) may include the CSG settings (e.g. CSG ID, access mode) of its associated RN-eNB function into an attach request message sent to the MME via the DeNB. That is, the DeNB may receive the attach request message from the RN, and may forward the message together with its own CSG settings of the DeNB cell to the MME (step 4). Upon receiving the attach request message from the RN(-UE), the MME knows the CSG settings of the RN-eNB associated with the RN-UE based on the additional information included in the attach request message, and is enabled to make an additional access control for the RN with regard to the RN-eNB function in addition to the access control with regard to the RN-UE function.

Besides applying a RN-UE access control mechanism based on the CSG settings of the DeNB cell and the RN-UE CSG subscription information (i.e. RN-UE subscribed CSG list (whitelist)) provided by the HSS (i.e. a check whether the RN-UE is a member of the DeNB cell) (step 6), the MME of the RN-UE may apply a RN-eNB access control mechanism based on the CSG settings of the DeNB and the RN-eNB (i.e. a check whether the CSG settings of the RN-UE are compatible with or permitted by the CSG settings of the DeNB cell) (step 7). That is, access control according to embodiments of the present invention considers both CSG settings (restrictions) of the layered CSG cells of the RN(-eNB) and the DeNB.

The access control result conveyed (via the DeNB) to the RN(UE) is a comprehensive result considering the access control of both the RN-UE function and the RN-eNB function (in steps 6 and 7). Only passing both access controls or checks, the RN(-UE) is permitted to access the network via the DeNB and to activate its RN(-eNB) cell. Otherwise, the RN(-UE) is rejected to access the network via the DeNB cell. That is, only if the RN-UE access control is successful and the RN-eNB access control is successful, the final overall access control for the RN(-UE) is successful.

According to embodiments of the present invention, a new failure reason may be defined and indicated to the RN(-UE) to make it aware of the specific reason for the failure. For example, if the RN-UE access control is successful and the RN-eNB access control is failed, the final overall access control for the RN(-UE) is failed with a failure reason indicating "Failure due to RN-eNB" or the like; if the RN-UE access control is failed and the RN-eNB access control is successful, the final overall access control for the RN(-UE) is failed with a failure reason indicating "Failure due to RN-UE" or the like;

if the RN-UE access control is failed and the RN-eNB access control is failed, the final overall access control for the RN(-UE) is failed with a failure reason indicating "Failure due to both" or the like.

The final overall access control for the RN(-UE) is reported to the RN(-UE) via the DeNB by way of correspondingly configured messages such as e.g. attach accept messages in case of success (steps 8a and 9a) or accept reject messages in case of failure (steps 8b and 9b).

As evident from the above, the messages used and, thus, the exchange of relevant information according to the present embodiments of the present invention are based on NAS (Non-Access Stratum) level procedures.

FIG. 7 shows a signaling diagram of a second exemplary procedure of relay node access control according to exemplary embodiments of the present invention.

As shown in FIG. 7, the MME in charge of the RN-UE performs an access control operation for the requesting RN (RN-UE from point of view of the network). According to embodiments of the present invention, such access control operation may comprise a two-fold access control or check. That is, as shown in steps 7 and 8 of FIG. 7, the MME may perform a CSG access control or check with regard to the RN-UE function and a CSG access control or check with regard to the RN-eNB function.

In this regard, required information, namely CSG settings of the DeNB cell, is provided by/via the DeNB, and further required information, namely CSG settings of the RN-eNB cell and the RN-UE CSG subscription information (i.e. RN-UE subscribed CSG list (whitelist)), is provided by/via a home subscriber system HSS (steps 5 and 6) by way of the RN-UE subscription information.

According to present embodiments of the present invention, RN-UE subscription information stored in the HSS is enhanced with the RN-eNB-related CSG setting information. That is, besides existing CSG subscription information of a (RN-)UE, as currently specified (e.g. in LTE Release 8/9), additional CSG subscription information is introduced for the RN(-UE/eNB). The additional CSG subscription information serves for enabling the consideration of the RN(-eNB) cell in access control according to embodiments of the present invention. The additional CSG subscription information may for example include CSG ID and CSG access mode of the RN-eNB associated with the RN-UE.

As shown in FIG. 7, after successful suitability checking at the RN, the RN initiates the attach process to the selected DeNB as a RN (phase 2 of the specified RN attach procedure) by way of an attach request message being sent to the DeNB. The DeNB may receive the attach request message from the RN, and may forward the same together with its own CSG settings of the DeNB cell to the MME (step 4).

Upon receiving the attach request message from the RN(-UE), the MME retrieves the CSG settings of the RN-eNB associated with the RN-UE (in addition to the RN-UE subscribed CSG list (whitelist) from the HSS (steps 5 and 6). Thereafter, the MME knows the CSG settings of the RN-eNB associated with the RN-UE based on the additional subscription information stored at the HSS, and is enabled to make an additional access control for the RN with regard to the RN-eNB function in addition to the access control with regard to the RN-UE function.

The following procedure of steps 7 to 10 according to FIG. 7 functionally corresponds to that of steps 6 to 9 according to FIG. 6. Therefore, reference is made to the corresponding description in connection with steps 6 to 9 according to FIG. 6 above.

Basically, besides applying a RN-UE access control mechanism based on the CSG settings of the DeNB cell and the RN-UE whitelist (i.e. a check whether the RN-UE is a member of the DeNB cell), the MME of the RN-UE may apply a RN-eNB access control mechanism based on the CSG settings of the DeNB and the RN-eNB (i.e. a check whether the CSG settings of the RN-eNB are compatible with or permitted by the CSG settings of the DeNB cell). That is, access control according to embodiments of the present invention considers both CSG settings (restrictions) of the layered CSG cells of the RN(-eNB) and the DeNB. The final overall access control for the RN(-UE) is reported to the RN(-UE) via the DeNB by way of correspondingly configured messages such as e.g. attach accept messages in case of success or accept reject messages in case of failure.

With regard to the RN-eNB access control mechanism, the MME may compare the additional CSG subscription information retrieved from the HSS and the CSG settings of the DeNB cell. Only if the CSG setting of the RN cell is compatible with or permitted by the DeNB cell, the RN(-UE) is accepted for access/admission. For example, if the CSG ID of the RN cell is the same as that of the DeNB cell, or even if the CSG ID of the RN cell is different from that of the DeNB cell but permitted by the DeNB cell (e.g. the RN cell is a close CSG cell, but the DeNB cell is a hybrid or open CSG cell), then the access control may be regarded as successful.

As evident from the above, the messages used and, thus, the exchange of relevant information according to the present embodiments of the present invention are based on NAS (Non-Access Stratum) level procedures and an enhanced RN(-UE) subscription.

FIG. 8 shows a signaling diagram of a third exemplary procedure of relay node access control according to exemplary embodiments of the present invention.

As shown in FIG. 8, the DeNB serving the requesting RN performs an access control operation for the requesting RN (RN-UE from point of view of the network). According to embodiments of the present invention, as shown in step 4, such access control operation may comprise a CSG access control or check with regard to the RN-eNB function.

In this regard, required information, namely CSG settings of the RN-eNB cell, is provided by the RN, and further required information, namely CSG settings of the DeNB cell, is locally acquired e.g. from a local storage of the DeNB.

As shown in FIG. 8, after successful suitability checking at the RN, the RN provides the CSG settings of the RN-eNB cell towards the network (step 3). To this end, when the RN-UE initiates the attach process to the selected DeNB as a RN (phase 2 of the specified RN attach procedure), the RN(-UE) may include the CSG settings (e.g. CSG ID, access mode) of its associated RN-eNB function into a (e.g. RRC) connection request message sent to the DeNB. That is, the DeNB may receive the thus configured (e.g. RRC) connection request message from the RN, and may use the contents of the message together with its own CSG settings of the DeNB cell for access/admission control of the RN(-UE) (step 4). Upon receiving the (e.g. RRC) connection request message from the RN(-UE), the DeNB knows the CSG settings of the RN-eNB associated with the RN-UE based on the additional information included in the (e.g. RRC) connection request message, and is enabled to make an access control for the RN with regard to the RN-eNB function.

According to present embodiments of the present invention, the provision of the relevant CSG setting information (e.g. CSG ID and access mode) from the RN may be accomplished when the RN is about to set up a RRC (radio resource control) connection with the respective DeNB cell to operate as a RN. To this end, according to embodiments of the present invention, a specific information element may be introduced in the RRCConnectionRequest message or the RRCConnectionSetupComplete message to indicate the CSG settings of the RN(-eNB) cell.

In principle, the following procedure of steps 4 and 5 according to FIG. 8 functionally corresponds to that of steps 7 to 9 according to FIG. 6 and/or steps 8 to 10 according to FIG. 7. Basically, the respective procedures only differ in the message type used for information exchange. Therefore, reference is made to the corresponding description in connection with FIGS. 6 and 7 above.

Basically, the DeNB may apply a RN-eNB access control mechanism based on the CSG settings of the DeNB and the RN-eNB (i.e. a check whether the CSG settings of the RN-UE are compatible with or permitted by the CSG settings of the DeNB cell). Stated in other words, the DeNB may perform a local access control or check by considering its own CSG settings. That is, access control according to embodiments of the present invention considers both CSG settings (restrictions) of the layered CSG cells of the RN(-eNB) and the DeNB. The final overall access control for the RN(-UE) is reported to the RN(-UE) by way of correspondingly configured messages such as a connection setup message (e.g. RRCConnectionSetup) in case of success or a connection reject message (e.g. RRCConnectionReject) in case of failure. Specifically, in case the CSG settings of the RN cell is not accepted by the DeNB, the DeNB cell rejects the RRC connection for the RN(UE) or releases the RRC connection previously established with the RN(-UE) cell, and may inform the specific reason by way of a new failure reason such as e.g. "CSG setting of the RN-eNB cell is not permitted" or the like.

As evident from the above, the messages used and, thus, the exchange of relevant information according to the present embodiments of the present invention are based on lower layer (i.e. AS (Access Stratum) level) procedures.

Figure 9:
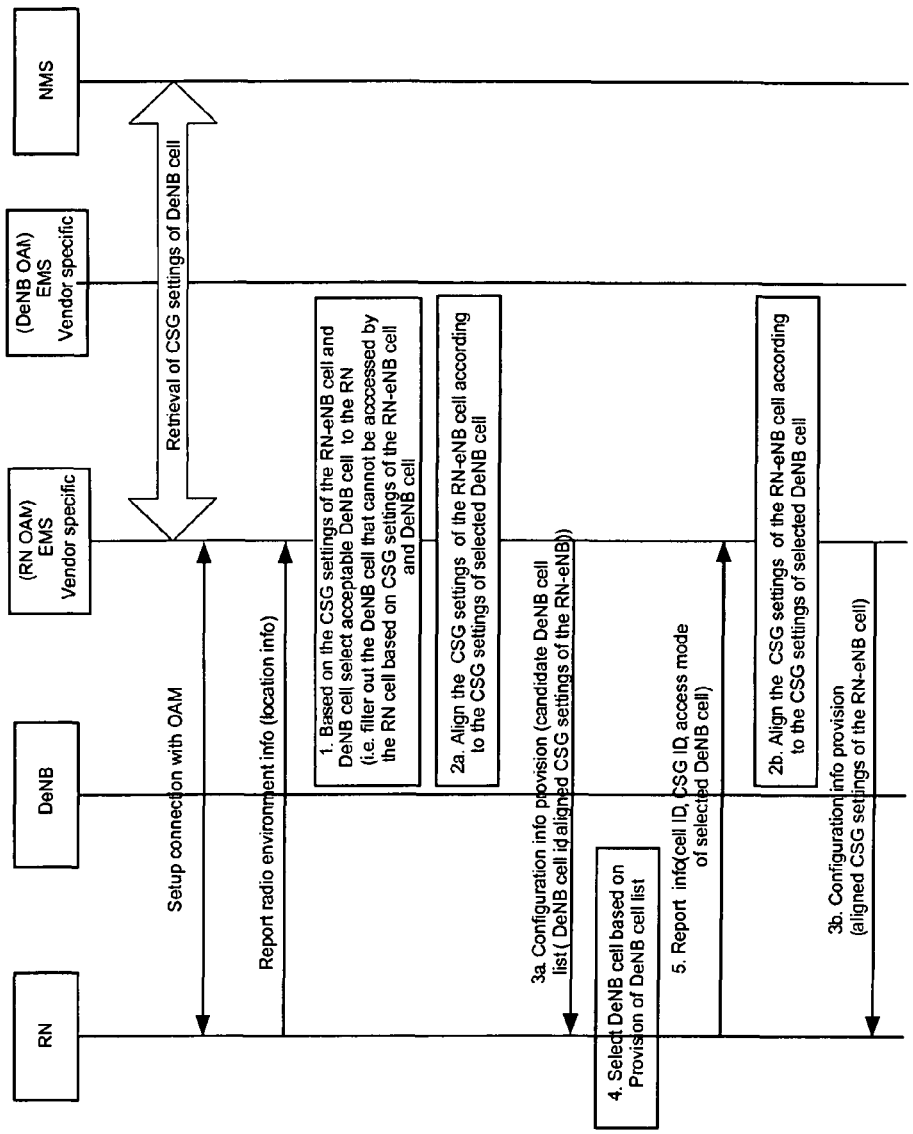
FIG. 9 shows a signaling diagram of an exemplary OAM-based procedure of access control according to exemplary embodiments of the present invention.

FIG. 9 shows a signaling diagram of an exemplary OAM-based procedure of access control according to exemplary embodiments of the present invention, i.e. an OAM-based access control mechanism.

By way of such OAM-based access control mechanism, a selection of an acceptable DeNB cell on the basis of the CSG settings of the RN-eNB cell and the DeNB cell may be accomplished (see step 1), and an alignment of CSG settings of the RN-eNB cell and the DeNB cell may be accomplished based thereon (see steps 2a, 2b, 3a, and 3b), e.g. at/by an OAM entity of the RN such as a vendor/operator-specific element management system (EMS). To this end, the RN-OAM entity may previously retrieve CSG settings of the DeNB cell from a network management system (NMS).

For further details in this regard, reference is made to FIG. 9.

Such OAM-based access control mechanism may be executed prior to or simultaneously with the previously described methods and procedures. Accordingly, exemplary embodiments of the present invention encompass a combination of the methods and/or procedures according to FIGS. 4 to 8 and the OAM-based access control mechanism according to FIG. 9 (in particular, any one of steps 1, 2a, 2b, 3a, 3b thereof).

In the above, it is assumed that a relay node has, or is capable of managing/providing, a single closed subscriber group.

According to embodiments of the present invention, it may be the case that a relay node has, or is capable of managing/providing, a plurality of closed subscriber groups. In such case, each time (i.e. for each access control), one CSG out of the plural CSGs of the respective relay node is handled in any one of the aforementioned methods and procedures, and the one relevant CSG has to be compatible with or permitted by the CSG settings of the DeNB as explained above. The one CSG being relevant for a respective access control may be selected (by any one of the RN, the MME and an OAM (operation and maintenance) system) on the basis of any one of many conceivable factors. Such factors could for example comprise at least one of location of the relay node, the donor base station, policy of operator, and temporal conditions.

In this regard, it is noted that RNs may not have an own hard coded CSG setting but may be able to support many CSG settings instead. For example, in a company different departments may have different CSGs (e.g. for research, production and finance) and, due to security reasons, access to other departments may not be permitted. However, a RN may be used by any one of the departments (but not by two at the same time). Then, the RN may have a broad set of possible CSG settings which is however narrowed down when connected to a DeNB. It could also be considered that a company may allow only a restricted CSG access to a (D)eNB but a more broad access to a RN connected to this (D)eNB, but not a fully liberal access. For example, the finance department may be connected via a RN to the HeNB which serves the production department, and this HeNB may take care to properly treat the data from both departments and avoid security leaks.

In order to support such cases, the network (namely, either the DeNB or the MME or the OAM system) may inform the RN which CSG is to be selected and used. The network may provide a specific CSG setting to the RN based on different factors, such as for example the location, the DeNB which would be selected by the RN, policy of operator, or a time reason. Alternatively, this may be done also by the RN by anticipating that it has to restrict its CSG settings to the CSG setting of the DeNB (or even more narrow). Then, still either the DeNB or the MME may authorize the RN which CSG setting in detail it is allowed and assumed to deploy (for example, the setting for finance or production but not research) upon the RN attaching to a network as a RN.

Embodiments of the present invention may be applicable for any use cases or scenarios with a relay-enhanced network architecture. Particularly, this includes any kind of introduction of the CSG concept in relay systems (e.g. of 3GPP Release 10 and beyond). For example, this may include uses cases such as indoor hotspot scenarios, the introduction of CSGs into macrocells, for enterprise usage of HeNBs in which relay nodes may be used to enhance the coverage, area of the enterprise HeNBs without additional cabling.

It is noted that the aforementioned methods and procedures are transparent to a user or user equipment connecting to a relay-enhanced cellular system via a relay node, thus enabling backwards compatibility for legacy UEs (of 3GPP Release 10 and before).

It is noted that the aforementioned methods and procedures may (at least implicitly) also be applicable for user (UE) access control. That is, by way of the method and procedures according to exemplary embodiments of the present invention, a requested access of a user (UE) to a relay-enhanced cellular system via a relay node and a donor base station thereof may be properly handled. Thereby, there may be provided a solution to the problem how the RN's access to the DeNB may be authenticated for enabling user access, via said RN.

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIGS. 10 and 11, while for the sake of brevity reference is made to the detailed description of respective corresponding methods and operations according to any one of FIGS. 4 to 9 above as well as to the detailed description of an underlying network architecture according to any one of FIGS. 1 to 3 above.

Figure 10:
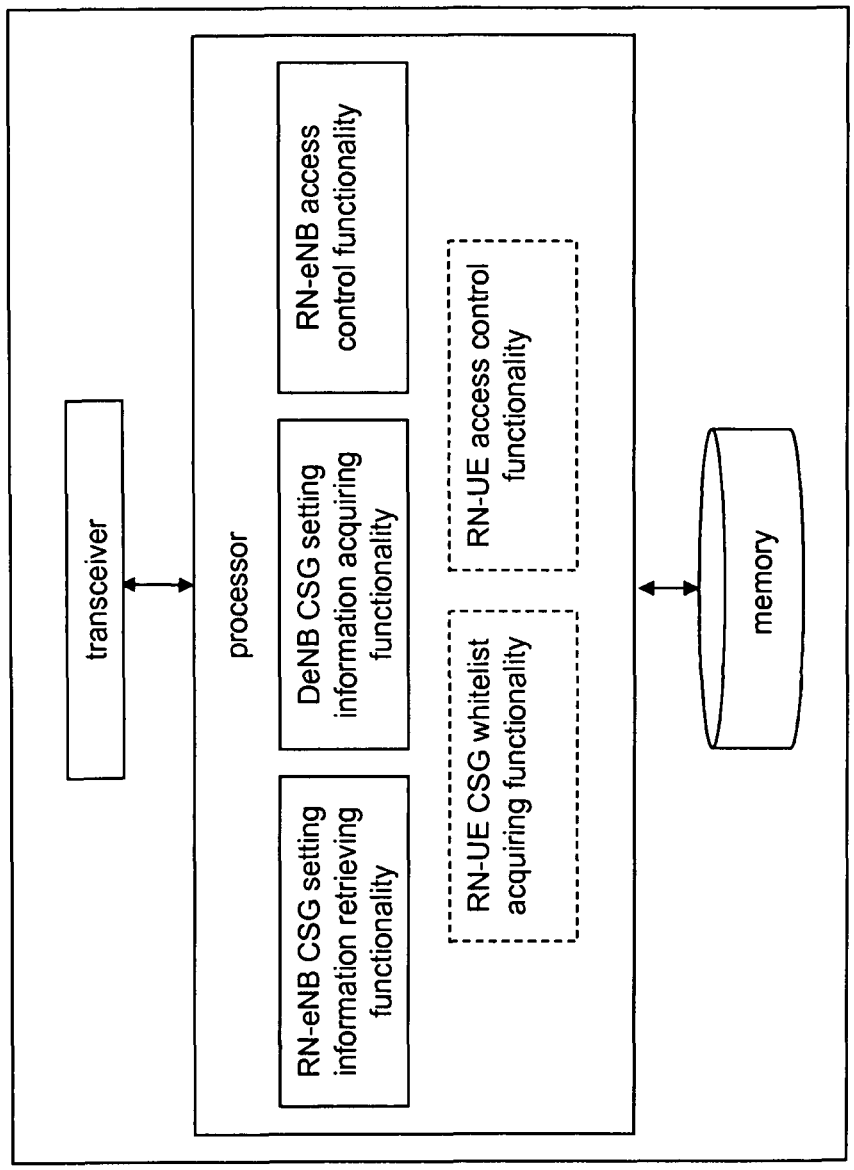
FIG. 10 shows a schematic block diagram of an exemplary device according to exemplary embodiments of the present invention.
Figure 11:
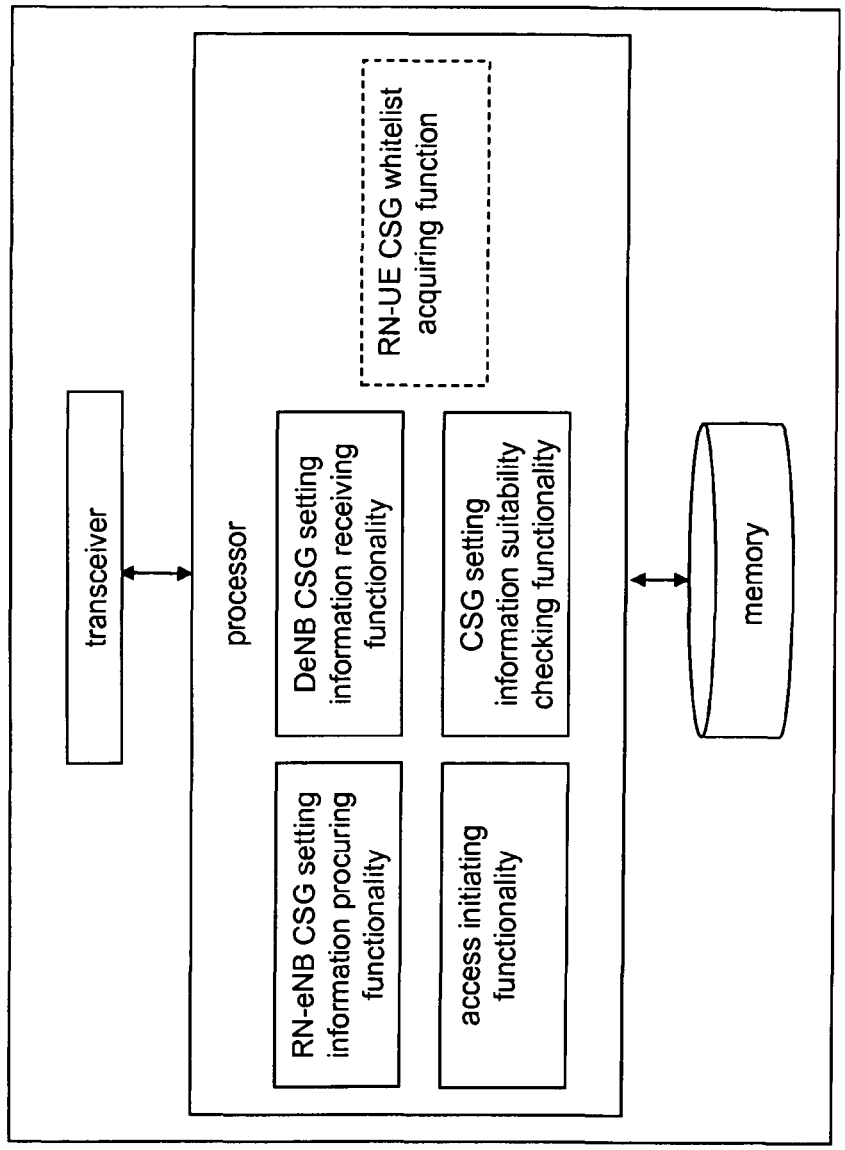
FIG. 11 shows a schematic block diagram of another exemplary device according to exemplary embodiments of the present invention.

In FIGS. 10 and 11, the solid line blocks are basically configured to perform respective operations as described, above. The entirety of solid line blocks are basically configured to perform the methods and operations as described above, respectively. With respect to FIGS. 10 and 11, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIGS. 10 and 11, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 9 shows a schematic block diagram of an exemplary device according to exemplary embodiments of the present invention. The thus depicted device may be an apparatus according exemplary embodiments of the present invention, and any combination of the thus depicted device with an appropriate other device (as evident from FIGS. 6 to 8 above) may be a system according exemplary embodiments of the present invention.

In view of the above, the thus described apparatus may represent a (part of an) apparatus such as a mobility management entity MME in the case of FIGS. 6 and 7, and/or a donor base station DeNB in the case of FIG. 8. In the case of FIGS. 6 and 7, the thus described apparatus may cooperate with the relay node RN, the mobility management entity MME and the home subscriber system HSS as described above. In the case of FIG. 8, the thus described apparatus may cooperate with the relay node RN as described above.

According to FIG. 10, the apparatus is an apparatus according to exemplary embodiments of the present invention, which is configured to perform a procedure as described in conjunction with FIG. 4. Therefore, while basic functionalities are described hereinafter, reference is made to the above description according to FIG. 4 as well as the above description of the MME according to FIGS. 6 and 7 and/or the DeNB according to FIG. 8 for details thereof.

According to FIG. 10, the thus depicted apparatus according to exemplary embodiments of the present invention comprises a processor and a transceiver as well as, optionally, a memory.

The processor may be specifically configured to retrieve setting information relating to a closed subscriber group of a base station function of a relay node, thus representing means for retrieving RN-eNB CSG setting information. In other words, the processor may have a corresponding RN-eNB CSG setting information retrieving functionality. Further, the processor may be specifically configured to acquire setting information relating to a closed subscriber group of the donor base station, thus representing means for acquiring DeNB CSG setting information. In other words, the processor may have a corresponding DeNB CSG setting information acquiring functionality. Still further, the processor may be specifically configured to perform access control of the base station function of the relay node based on the setting information relating to the closed subscriber groups of the base station function of the relay node and the donor base station, thus representing means for performing RN-eNB access control. In other words, the processor may have a corresponding RN-eNB access control functionality.

Additionally, for the embodiments according to FIGS. 6 and 7, the processor may be specifically configured to acquire a whitelist defining one or more closed subscriber groups in which the user equipment function of the relay node is a member, thus representing means for acquiring a RN-UE CSG whitelist. In other words, the processor may have a corresponding RN-UE CSG whitelist acquiring functionality. Also, the processor may be specifically configured to perform access control of the user equipment function of the relay node based on the setting information relating to the closed subscriber group of the donor base station and the whitelist, thus representing means for performing RN-UE access control. In other words, the processor may have a corresponding RN-UE access control functionality.

The transceiver may be specifically configured to receive and/or transmit corresponding information in the form of corresponding messages to and/or from respective counterpart entities as evident from FIGS. 6 to 8.

The memory may be specifically configured to store relevant information and/or messages in the context of the above-described operations, procedures and functions. In other words, the memory may represent a local storage as described above.

Although not shown, embodiments of the present invention also encompass entities and/or functions for supporting the above-described apparatus in access control. In the case of FIGS. 6 and 7, such supporting entities and/or functions according to embodiments of the present invention may comprise the RN, the DeNB, and/or the HSS. In the case of FIG. 8, such supporting entities and/or functions according to embodiments of the present invention may comprise the RN. Such supporting entities and/or functions according to embodiments of the present invention are essentially configured to (e.g. have a processor and corresponding means configured to) provide setting information relating to a closed subscriber group of a base station function of a relay node for access control of the base station function of the relay node.

Although not shown, embodiments of the present invention also encompass entities and/or functions for supporting the above-described apparatus in access control, as shown in FIG. 9. That is, the RN and/or DeNB may be specifically configured accordingly, and/or the RN-OAM, the DeNB-OAM and the NMS may be specifically provided and configured accordingly. Such supporting entities and/or functions according to embodiments of the present invention are essentially configured to (e.g. have a processor and corresponding means configured to) accomplish the features and effects of the OAM-based access control mechanism according to FIG. 9.

Although not shown, embodiments of the present invention also encompass a home subscriber system HSS capable of supporting (storing) enhanced RN-UE subscription information as described above. Such home subscriber system HSS may be applicable for the embodiments according to FIG. 7. Accordingly, a home subscriber system HSS according embodiments of the present invention may include a correspondingly configured local storage as well as a processor and a transceiver to properly participate in cooperation with the DeNB as described in connection with FIG. 7.

FIG. 10 shows a schematic block diagram of an exemplary device according to exemplary embodiments of the present invention. The thus depicted device may be an apparatus according exemplary embodiments of the present invention, and any combination of the thus depicted device with an appropriate other device (as evident from FIGS. 6 to 8 above) may be a system according exemplary embodiments of the present invention.

In view of the above, the thus described apparatus may represent a (part of an) apparatus such as a relay node RN in the case of FIGS. 6 to 8. The thus described apparatus may cooperate with the donor base station DeNB and/or the mobility management entity MME as described above.

According to FIG. 11, the apparatus is an apparatus according to exemplary embodiments of the present invention, which is configured to perform a procedure as described in conjunction with FIG. 5. Therefore, while basic functionalities are described hereinafter, reference is made to the above description according to FIG. 5 as well as the above description of the RN according to FIGS. 6 to 8 for details thereof.

According to FIG. 11, the thus depicted apparatus according to exemplary embodiments of the present invention comprises a processor and a transceiver as well as, optionally, a memory.

The transceiver and/or the processor may be specifically configured to receive setting information relating to a closed subscriber group of the donor base station, thus representing means for receiving DeNB CSG setting information. In other words, the processor may have a corresponding DeNB CSG setting information receiving functionality. The processor may be specifically configured to procure setting information relating to a closed subscriber group of a base station function of a relay node, thus representing means for procuring RN-eNB CSG setting information. In other words, the processor may have a corresponding RN-eNB CSG setting information procuring functionality. Further, the processor may be specifically configured to perform a suitability check of the base station function of the relay node based on the setting information relating to the closed subscriber groups of the base station function of the relay node and the donor base station, thus representing means for performing a (RN-eNB) CSG setting information suitability check. In other words, the processor may have a corresponding a CSG setting information suitability checking functionality. Still further, the processor may be specifically configured to initiate an access to the relay-enhanced cellular system via the donor base station, thus representing means for initiating an access. In other words, the processor may have a corresponding access initiating functionality.

Additionally, for the embodiments according to FIGS. 6 to 8, the processor may be specifically configured to acquire a whitelist defining one or more closed subscriber groups in which the user equipment function of the relay node is a member, thus representing means for acquiring a RN-UE CSG whitelist. In other words, the processor may have a corresponding RN-UE CSG whitelist acquiring functionality. Also, the processor may be specifically configured to perform a suitability check of a user equipment function of the relay node based on the setting information relating to the closed subscriber group of the donor base station and the whitelist, thus representing means for performing a RN-UE CSG setting information suitability checking functionality. In other words, the CSG setting information suitability checking functionality of the processor may be adapted accordingly. In such a case, the access initiating functionality of the processor may be adapted accordingly such that the access initiation is only performed when both suitability checks are successful.

Regarding the access initiating functionality, according to embodiments of the present invention, access may be initiated by providing the setting information relating to a closed subscriber group of a base station function of a relay node to the relay-enhanced cellular system. Hence, the processor may represent means for providing RN-eNB CSG setting information toward the network or, in other words, the processor may have a corresponding RN-eNB CSG setting information providing functionality. In the embodiments according to FIGS. 6 and 8, such initiation or provision of corresponding information may be accomplished by way of inclusion into a specific message and transmission thereof towards the network. In the embodiments according to FIG. 7, such initiation or provision of corresponding information may be accomplished (in an indirect manner, say logically or virtually) by way of enhanced RN-UE subscription information at the HSS.

The transceiver may be specifically configured to receive and/or transmit corresponding information in the form of corresponding messages to and/or from respective counterpart entities as evident from FIGS. 6 to 8.

The memory may be specifically configured to store relevant information and/or messages in the context of the above-described operations, procedures and functions. In other words, the memory may represent a local storage as described above.

According to exemplarily embodiments of the present invention, a system may comprise any conceivable combination of the thus depicted apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

Generally, for the purpose of the present invention as described herein above, it should be noted that

- method steps and functions likely to be implemented as software code portions and being run using a processor at one of the entities, a network element, or a terminal (as examples of devices, apparatuses and/or modules thereof, or as examples of entities including apparatuses and/or modules therefor), are software code independent and can be specified using any known or future developed programming language, such as e.g. Java, C++, C, and Assembler, as long as the functionality defined by the method steps is preserved;

- method steps, functions, and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;

- devices, apparatuses, units or means can be implemented as individual devices, apparatuses, units or means, but this does not exclude that they are implemented in a distributed fashion throughout the system, as long as the functionality of the device, apparatus, unit or means is preserved,

- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

- a device may be regarded as an apparatus or as an assembly of more than one apparatus, whether functionally in cooperation with each other or functionally independently of each other but in a same device housing, for example.

The present invention also covers any conceivable combination of method steps and operations described above, and any conceivable combination of nodes, apparatuses, modules or elements described above, as long as the above-described concepts of methodology and structural arrangement are applicable.

There are provided measures for access control of a relay node with a closed subscriber group, said measures exemplarily comprising retrieval of setting information relating to a closed subscriber group of a base station function of a relay node, said relay node requesting access to a relay-enhanced cellular system via a donor base station, acquisition of setting information relating to a closed subscriber group of the donor base station, and execution of access control of the base station function of the relay node based on the setting information relating to the closed subscriber groups of the base station function of the relay node and the donor base station.

The measures proposed according to exemplary embodiments of the present invention may be applied for any kind of relay-enhanced cellular system, such as for example for those in accordance with 3GPP RAN2/RAN3 standards and/or 3GPP LTE standards of release 10/11/12/ . . . (LTE-Advanced and its evolutions).

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising:
retrieving setting information relating to a closed subscriber group of a base station function of a relay node when said relay node requests access to a relay-enhanced cellular system via a donor base station,
acquiring setting information relating to a closed subscriber group of the donor base station, and
performing access control of the base station function of the relay node to said relay-enhanced cellular system based on the setting information relating to the closed subscriber group of the base station function of the relay node and the setting information relating to the closed subscriber group of the donor base station.

2. An apparatus comprising:
a processor; and
a memory including computer program code, the memory and the computer program code configured, with the processor, to cause the apparatus to perform at least the following:
retrieve setting information relating to a closed subscriber group of a base station function of a relay node when said relay node requests access to a relay-enhanced cellular system via the apparatus,
acquire setting information relating to a closed subscriber group of the apparatus, and
perform access control of the base station function of the relay node to said relay-enhanced cellular system based on the setting information relating to the closed subscriber group of the base station function of the relay node and the setting information relating to the closed subscriber group of the apparatus.

3. The apparatus according to claim 2, wherein
the setting information comprises at least one of an identity of the closed subscriber group and an access mode of the base station function of the relay node and the apparatus, respectively, and/or
the closed subscriber group of the base station function of the relay node is one of a plurality of closed subscriber groups of the relay node, which is selected on the basis of at least one of location of the relay node, the apparatus, policy of operator, and temporal conditions.

4. The apparatus according to claim 2, wherein
the access control of the base station function of the relay node is successful when the setting information relating to the closed subscriber group of the base station function of the relay node and the setting information relating to the closed subscriber group of the apparatus are compatible in terms of at least one of identity, access mode, and members.

5. The apparatus according to claim 2, wherein the apparatus is operable as or at a mobility management entity of a user equipment function of the relay node.

6. The apparatus according to claim 5, wherein the memory and the computer program code are further configured, with the processor, to cause the apparatus to perform at least the following:
perform access control of the user equipment function of the relay node based on the setting information relating to the closed subscriber group of the apparatus and a whitelist defining one or more closed subscriber groups in which the user equipment function of the relay node is a member, wherein the access control of the user equipment function of the relay node is successful when the user equipment function of the relay node is a member of the closed subscriber group of the apparatus, and
the memory and the computer program code are further configured, with the processor, to cause the apparatus to perform at least the following:
send an attach accept message to the apparatus and/or the relay node when both the access control of the base station function of the relay node and the access control of the user equipment function of the relay node are successful, or
send an attach reject message to the apparatus and/or the relay node when at least one of the access control of the base station function of the relay node and the access control of the user equipment function of the relay node is not successful.

7. The apparatus according to claim 5, wherein the memory and the computer program code are further configured, with the processor, to cause the apparatus to perform at least the following:
for retrieving and acquiring, receive the setting information relating to the closed subscriber groups of the base station function of the relay node and the apparatus from the donor base station, and/or
the setting information relating to the closed subscriber group of the base station function of the relay node is included in an attach request message.

8. The apparatus according to claim 5, wherein the memory and the computer program code are further configured, with the processor, to cause the apparatus to perform at least the following:
for retrieving, fetch the setting information relating to the closed subscriber group of the base station function of the relay node from a home subscriber system storing the setting information relating to the closed subscriber group of the base station function of the relay node as part of subscription information of the user equipment function of the relay node, and/or
the apparatus further comprises a receiver configured to and/or the memory and the computer program code are further configured, with the processor, to cause the apparatus to perform at least the following:
receive the setting information relating to the closed subscriber group of the apparatus from the apparatus, and/or
the memory and the computer program code are further configured, with the processor, to cause the apparatus to perform at least the following:
receive an attach request message from the donor base station.

9. The apparatus according to any one of claim 2, wherein the apparatus is operable as or at the donor base station.

10. The apparatus according to claim 9, wherein the memory and the computer program code are further configured, with the processor, to cause the apparatus to perform at least the following:
for retrieving, receive the setting information relating to the closed subscriber group of the base station function of the relay node from the relay node, and/or
the setting information relating to the closed subscriber group of the base station function of the relay node is included in a connection request message, and/or
the memory and the computer program code are further configured, with the processor, to cause the apparatus to perform at least the following:

obtain the setting information relating to the closed subscriber group of the apparatus locally from a local storage of the apparatus, and/or the memory and the computer program code are further configured, with the processor, to cause the apparatus to perform at least the following:

send a connection setup message to the relay node when the access control of the base station function of the relay node is successful, or send a connection reject message to the relay node when the access control of the base station function of the relay node is not successful.

11. The apparatus according to claim 2, wherein the apparatus and/or the relay node is part of an evolved radio access network in accordance with LTE and/or LTE-Advanced specifications.

12. A method comprising:

providing setting information relating to a closed subscriber group of a base station function of a relay node for access control of the base station function of the relay node when said relay node requests access to a relay-enhanced cellular system via a donor base station having a closed subscriber group;

receiving setting information relating to a closed subscriber group of a donor base station; and performing a suitability check of the base station function of the relay node based on the setting information relating to the closed subscriber group of the base station function of the relay node and the setting information relating to the closed subscriber group of the donor base station.

13. The method according to claim 12, wherein the method is operable at or by the relay node, and wherein the method further comprises:

performing a suitability check of a user equipment function of the relay node based on the setting information relating to the closed subscriber group of the donor base station and a whitelist defining one or more closed subscriber groups in which the user equipment function of the relay node is a member, and wherein the providing is performed only when both suitability checks are successful such that the user equipment function of the relay node is a member of the closed subscriber group of the donor base station and the setting information relating to the closed subscriber group of the base station function of the relay node and the setting information relating to the closed subscriber group of the donor base station are compatible in terms of at least one of identity, access mode, and members.

14. An apparatus comprising:

a processor; and a memory including computer program code, the memory and the computer program code configured, with the processor, to cause the apparatus to perform at least the following:

provide setting information relating to a closed subscriber group of a base station function of the apparatus for access control of the base station function of the apparatus when said apparatus requests access to a relay-enhanced cellular system via a donor base station having a closed subscriber group;

receive setting information relating to a closed subscriber group of a donor base station; and perform a suitability check of the base station function of the apparatus based on the setting information relating to the closed subscriber group of the base station function of the apparatus and the setting information relating to the closed subscriber group of the donor base station.

15. The apparatus according to claim 14, wherein the setting information comprises at least one of an identity of the closed subscriber group and an access mode of the base station function of the apparatus, and/or the closed subscriber group of the base station function of the apparatus is one of a plurality of closed subscriber groups of the apparatus selected on the basis of at least one of location of the apparatus, policy of operator, the donor base station, and temporal conditions.

16. The apparatus according to claim 14, wherein the apparatus is operable as or at a relay node.

17. The apparatus according to claim 16, wherein the memory and the computer program code are further configured, with the processor, to cause the apparatus to perform at least the following:

perform a suitability check of a user equipment function of the apparatus based on the setting information relating to the closed subscriber group of the donor base station and a whitelist defining one or more closed subscriber groups wherein the user equipment function of the apparatus is a member, and perform the providing only when both suitability checks are successful such that the user equipment function of the apparatus is a member of the closed subscriber group of the donor base station and the setting information relating to the closed subscriber group of the base station function of the apparatus and the setting information relating to the closed subscriber group of the donor base station are compatible in terms of at least one of identity, access mode, and members.

18. The apparatus according to claim 16, wherein the memory and the computer program code are further configured, with the processor, to cause the apparatus to perform at least the following:

transmit the setting information relating to the closed subscriber group of the base station function of the apparatus to the donor base station, and/or activate the base station function of the apparatus upon receipt of an attach accept message or a connection setup message, or reject access of the apparatus upon receipt of an attach reject message or a connection reject message.

19. The apparatus according to claim 16, wherein the setting information relating to the closed subscriber group of the base station function of the apparatus is included in an attach request message, or the setting information relating to the closed subscriber group of the base station function of the apparatus is included in connection request message.

20. The apparatus according to claim 14, wherein the apparatus is operable as or at the donor base station.

21. The apparatus according to claim 20, wherein the memory and the computer program code are further configured, with the processor, to cause the apparatus to perform at least the following:

receive the setting information relating to the closed subscriber group of the base station function of the apparatus from the apparatus, and/or transmit the setting information relating to the closed subscriber group of the base station function of the apparatus to a mobility management entity of a user equipment function of the apparatus, and/or the setting information relating to the closed subscriber group of the base station function of the apparatus is included in an attach request message.

22. The apparatus according to claim 14, wherein the apparatus is operable as or at a home subscriber system.

23. The apparatus according to claim 22, wherein the memory and the computer program code are further configured, with the processor, to cause the apparatus to perform at least the following:
- transmit the setting information relating to the closed subscriber group of the base station function of the apparatus to a mobility management entity of a user equipment function of the apparatus, and/or
- the setting information relating to the closed subscriber group of the base station function of the apparatus is included in subscription information of the user equipment function of the apparatus, and/or
- the memory and the computer program code are further configured, with the processor, to cause the apparatus to perform at least the following:
  - receive a request for fetching the setting information relating to the closed subscriber group of the base station function of the apparatus from the mobility management entity, and
- the memory and the computer program code are further configured, with the processor, to cause the apparatus to perform at least the following:
  - obtain the setting information relating to the closed subscriber group of the base station function of the apparatus locally from a local storage storing the setting information relating to the closed subscriber group of the base station function of the apparatus as part of subscription information of the user equipment function of the apparatus.

* * * * *